United States Patent
Awoniyi-Oteri et al.

(10) Patent No.: US 12,047,311 B2
(45) Date of Patent: Jul. 23, 2024

(54) TECHNIQUES FOR SWITCHING A BANDWIDTH PART CONFIGURATION

(71) Applicant: QUALCOMM Incorporated, San Diego, CA (US)

(72) Inventors: Olufunmilola Omolade Awoniyi-Oteri, San Diego, CA (US); Peter Pui Lok Ang, San Diego, CA (US); Jelena Damnjanovic, Del Mar, CA (US); Tao Luo, San Diego, CA (US); Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/226,819

(22) Filed: Apr. 9, 2021

(65) Prior Publication Data
US 2022/0329371 A1     Oct. 13, 2022

(51) Int. Cl.
*H04L 5/00*     (2006.01)
*H04W 76/15*    (2018.01)

(52) U.S. Cl.
CPC .......... *H04L 5/0032* (2013.01); *H04L 5/0098* (2013.01); *H04W 76/15* (2018.02)

(58) Field of Classification Search
None
See application file for complete search history.

(56) References Cited

U.S. PATENT DOCUMENTS

2020/0235896 A1*  7/2020  Lee .................. H04L 5/0098
2020/0267645 A1   8/2020  Wu et al.
(Continued)

FOREIGN PATENT DOCUMENTS

WO   WO-2021027918 A1   2/2021

OTHER PUBLICATIONS

Ericsson: "Further Analysis of Partial Overlap BWP Triggering on Multiple CCs", 3GPP TSG RAN WG4 Meeting #94-e, R4-2004406, 3rd Generation Partnership Project, Mobile Competence Centre, 650, Route Des Lucioles, F-06921 Sophia-Antipolis Cedex, France, vol. RAN WG4, No. Online Meeting, Apr. 20, 2020-Apr. 30, 2020 Apr. 10, 2020, XP051872916, 5 Pages, Retrieved from the Internet: URL: https://ftp.3gpp.org/tsg_ran/WG4_Radio/TSGR4_94_eBis/Docs/R4-2004406.zip R4-2004406 multiple CCs BWP switch.docx.

(Continued)

*Primary Examiner* — Saumit Shah
(74) *Attorney, Agent, or Firm* — Dalei Dong; Holland & Hart LLP

(57) ABSTRACT

Device and techniques for wireless communications are described. A user equipment (UE) may switch from a first bandwidth part (BWP) configuration to a second BWP configuration based on a trigger for transitioning from a first activity state to a second activity state with respect to a cell group. The trigger may be an expiration of a timer at the UE, or the UE may receive control signaling indicating the transition. The second BWP configuration may be based on a mode configured at the UE associated with the second activity state. The configured mode may indicate one or more measurements the UE is to perform while in the second activity state. In some examples, the BWP configuration may include configured BWPs based on the indicated measurements of the configured mode.

30 Claims, 17 Drawing Sheets

(56) References Cited

U.S. PATENT DOCUMENTS

| | | |
|---|---|---|
| 2021/0105722 A1 | 4/2021 | Tsai et al. |
| 2021/0203468 A1* | 7/2021 | Yi ..................... H04W 52/0229 |
| 2022/0046522 A1* | 2/2022 | Kim .................. H04W 52/365 |
| 2022/0167267 A1 | 5/2022 | Ma et al. |
| 2022/0312417 A1* | 9/2022 | Venkata .................. H04L 5/001 |
| 2022/0312519 A1* | 9/2022 | Xu .................... H04W 52/0219 |
| 2022/0322418 A1* | 10/2022 | Kim ...................... H04L 1/0008 |
| 2023/0109920 A1* | 4/2023 | Zhang .................. H04L 5/0094 375/262 |
| 2023/0276321 A1* | 8/2023 | Da Silva ........... H04W 36/0088 370/252 |

OTHER PUBLICATIONS

International Search Report and Written Opinion—PCT/US2022/019823—ISA/EPO—Jun. 22, 2022.

* cited by examiner

TECHNIQUES FOR SWITCHING A BANDWIDTH PART CONFIGURATION

FIELD OF DISCLOSURE

The present disclosure, for example, relates to wireless communication systems, more particularly to techniques for switching a bandwidth part (BWP) configuration.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, wireless devices may be configured to communicate using a dual connectivity (DC) configuration. However, for some use cases, conventional DC techniques may be deficient or sub-optimal in some current configurations.

SUMMARY

The described techniques relate to improved techniques, devices, and apparatuses that support techniques for switching a bandwidth part (BWP) configuration. The described techniques provide a solution where a user equipment (UE) switches to various BWPs depending on the activity state that the UE may be in. For example, the UE may transition from a secondary cell group (SCG) dormancy state to an active state, and thus the UE may switch to a large BWP. In some other examples, the UE may transition from the active state to the SCG dormancy state, and thus the UE may switch to a smaller BWP to save power.

A method for wireless communication at a UE is described. The method may include establishing a first connection with at least a first cell of a first cell group, establishing a second connection with at least a second cell of a second cell group, switching from a first BWP configuration to a second BWP configuration based on a trigger indicating that the UE is to transition from a first activity state to a second activity state, the first activity state and the second activity state corresponding to communications with the second cell group, and communicating with the second cell of the second cell group according to the second activity state and the second BWP configuration.

An apparatus for wireless communication at a UE is described. The apparatus may include a processor, memory coupled with the processor, and instructions stored in the memory. The instructions may be executable by the processor to cause the apparatus to establish a first connection with at least a first cell of a first cell group, establish a second connection with at least a second cell of a second cell group, switch from a first BWP configuration to a second BWP configuration based on a trigger indicating that the UE is to transition from a first activity state to a second activity state, the first activity state and the second activity state corresponding to communications with the second cell group, and communicate with the second cell of the second cell group according to the second activity state and the second BWP configuration.

Another apparatus for wireless communication at a UE is described. The apparatus may include means for establishing a first connection with at least a first cell of a first cell group, means for establishing a second connection with at least a second cell of a second cell group, means for switching from a first BWP configuration to a second BWP configuration based on a trigger indicating that the UE is to transition from a first activity state to a second activity state, the first activity state and the second activity state corresponding to communications with the second cell group, and means for communicating with the second cell of the second cell group according to the second activity state and the second BWP configuration.

A non-transitory computer-readable medium storing code for wireless communication at a UE is described. The code may include instructions executable by a processor to establish a first connection with at least a first cell of a first cell group, establish a second connection with at least a second cell of a second cell group, switch from a first BWP configuration to a second BWP configuration based on a trigger indicating that the UE is to transition from a first activity state to a second activity state, the first activity state and the second activity state corresponding to communications with the second cell group, and communicate with the second cell of the second cell group according to the second activity state and the second BWP configuration.

Some examples of the method, apparatuses, and non-transitory computer-readable medium described herein may further include operations, features, means, or instructions for transitioning from the first activity state to the second activity state based on the trigger indicating that the UE may be to transition from the first activity state to the second activity state, where communicating with the second cell of the second cell group may be based on transitioning from the first activity state to the second activity state.

Some examples of the method, apparatuses, and non-transitory computer-readable medium described herein may further include operations, features, means, or instructions for receiving a configuration message indicating a set of indices, each index associated with a respective BWP configuration of a set of BWP configurations, where a first index of the set of indices may be associated with the first BWP configuration and a second index of the set of indices may be associated with the second BWP configuration.

Some examples of the method, apparatuses, and non-transitory computer-readable medium described herein may further include operations, features, means, or instructions for determining an expiration of a timer at the UE, where the trigger indicating that the UE may be to transition from the first activity state to the second activity state includes the determined expiration.

Some examples of the method, apparatuses, and non-transitory computer-readable medium described herein may further include operations, features, means, or instructions for receiving control signaling including the trigger indicating that the UE may be to transition from the first activity state to the second activity state, where switching from the first BWP configuration to the second BWP configuration may be based on the received control signaling.

In some examples of the method, apparatuses, and non-transitory computer-readable medium described herein, the received control signaling includes a second trigger that indicates that the UE may be to switch from the first BWP configuration to the second BWP configuration.

Some examples of the method, apparatuses, and non-transitory computer-readable medium described herein may further include operations, features, means, or instructions for receiving second control signaling including a second trigger indicating that the UE may be to switch from the first BWP configuration to the second BWP configuration, where switching from the first BWP configuration to the second BWP configuration may be based on the received second control signaling.

In some examples of the method, apparatuses, and non-transitory computer-readable medium described herein, the received control signaling may be received via a cell of the first cell group.

In some examples of the method, apparatuses, and non-transitory computer-readable medium described herein, the received control signaling may be received in a physical downlink control channel (PDCCH) transmission, a medium access control (MAC) control element (MAC-CE), a downlink control information (DCI) message, or any combination thereof.

Some examples of the method, apparatuses, and non-transitory computer-readable medium described herein may further include operations, features, means, or instructions for performing one or more network synchronization operations, where communicating with the second cell of the second cell group may be based on the performed one or more network synchronization operations.

In some examples of the method, apparatuses, and non-transitory computer-readable medium described herein, a first BWP associated with the first BWP configuration at least partially overlaps with a second BWP associated with the second BWP configuration.

In some examples of the method, apparatuses, and non-transitory computer-readable medium described herein, the first BWP configuration includes a first uplink BWP, a first downlink BWP, or both and the second BWP configuration includes a second uplink BWP, a second downlink BWP, or both.

In some examples of the method, apparatuses, and non-transitory computer-readable medium described herein, each of the first activity state and the second activity state includes a dormancy state, a deactivated state, or an active state.

In some examples of the method, apparatuses, and non-transitory computer-readable medium described herein, a mode associated with the dormancy state or the deactivated state includes radio resource management (RRM), radio link monitoring (RLM), one or more Layer 1 measurements, one or more Layer 1 reports, one or more beam failure detection (BFD) measurements, one or more sounding procedures, uplink control signaling, downlink control signaling, downlink data signaling, or any combination thereof.

In some examples of the method, apparatuses, and non-transitory computer-readable medium described herein, the first cell group includes a master cell group (MCG) and the second cell group includes an SCG.

A method for wireless communication at a base station is described. The method may include establishing a first connection with a UE via at least a first cell of a first cell group, establishing a second connection with the UE via at least a second cell of a second cell group, determining that the UE has switched from a first BWP configuration to a second BWP configuration based on a trigger indicating that the UE is to transition from a first activity state to a second activity state, the first activity state and the second activity state corresponding to communications with the second cell group, and communicating with the UE via the second cell of the second cell group according to the second activity state and the second BWP configuration.

An apparatus for wireless communication at a base station is described. The apparatus may include a processor, memory coupled with the processor, and instructions stored in the memory. The instructions may be executable by the processor to cause the apparatus to establish a first connection with a UE via at least a first cell of a first cell group, establish a second connection with the UE via at least a second cell of a second cell group, determine that the UE has switched from a first BWP configuration to a second BWP configuration based on a trigger indicating that the UE is to transition from a first activity state to a second activity state, the first activity state and the second activity state corresponding to communications with the second cell group, and communicate with the UE via the second cell of the second cell group according to the second activity state and the second BWP configuration.

Another apparatus for wireless communication at a base station is described. The apparatus may include means for establishing a first connection with a UE via at least a first cell of a first cell group, means for establishing a second connection with the UE via at least a second cell of a second cell group, means for determining that the UE has switched from a first BWP configuration to a second BWP configuration based on a trigger indicating that the UE is to transition from a first activity state to a second activity state, the first activity state and the second activity state corresponding to communications with the second cell group, and means for communicating with the UE via the second cell of the second cell group according to the second activity state and the second BWP configuration.

A non-transitory computer-readable medium storing code for wireless communication at a base station is described. The code may include instructions executable by a processor to establish a first connection with a UE via at least a first cell of a first cell group, establish a second connection with the UE via at least a second cell of a second cell group, determine that the UE has switched from a first BWP configuration to a second BWP configuration based on a trigger indicating that the UE is to transition from a first activity state to a second activity state, the first activity state and the second activity state corresponding to communications with the second cell group, and communicate with the UE via the second cell of the second cell group according to the second activity state and the second BWP configuration.

Some examples of the method, apparatuses, and non-transitory computer-readable medium described herein may further include operations, features, means, or instructions for transmitting, to the UE, a configuration message indicating a set of indices, each index associated with a respective BWP configuration of a set of BWP configurations, where a first index of the set of indices may be associated with the first BWP configuration and a second index of the set of indices may be associated with the second BWP configuration.

Some examples of the method, apparatuses, and non-transitory computer-readable medium described herein may further include operations, features, means, or instructions for determining an expiration of a timer at the UE, where the trigger indicating that the UE may be to transition from the first activity state to the second activity state includes the determined expiration.

Some examples of the method, apparatuses, and non-transitory computer-readable medium described herein may further include operations, features, means, or instructions for transmitting, to the UE, control signaling including the trigger indicating that the UE may be to transition from the first activity state to the second activity state, where determining that the UE may have switched from the first BWP configuration to the second BWP configuration may be based on the transmitted control signaling.

In some examples of the method, apparatuses, and non-transitory computer-readable medium described herein, the transmitted control signaling includes a second trigger that indicates that the UE may be to switch from the first BWP configuration to the second BWP configuration.

Some examples of the method, apparatuses, and non-transitory computer-readable medium described herein may further include operations, features, means, or instructions for transmitting, to the UE, second control signaling including a second trigger indicating that the UE may be to switch from the first BWP configuration to the second BWP configuration, determining that the UE may have switched from the first BWP configuration to the second BWP configuration may be based on the received second control signaling.

In some examples of the method, apparatuses, and non-transitory computer-readable medium described herein, the transmitted control signaling may be transmitted via a cell of the first cell group.

In some examples of the method, apparatuses, and non-transitory computer-readable medium described herein, the transmitted control signaling may be transmitted in a PDCCH transmission, a MAC-CE, a DCI message, or any combination thereof.

In some examples of the method, apparatuses, and non-transitory computer-readable medium described herein, a first BWP associated with the first BWP configuration at least partially overlaps with a second BWP associated with the second BWP configuration.

In some examples of the method, apparatuses, and non-transitory computer-readable medium described herein, the first BWP configuration includes a first uplink BWP, a first downlink BWP, or both and the second BWP configuration includes a second uplink BWP, a second downlink BWP, or both.

In some examples of the method, apparatuses, and non-transitory computer-readable medium described herein, each of the first activity state and the second activity state includes a dormancy state, a deactivated state, or an active state.

In some examples of the method, apparatuses, and non-transitory computer-readable medium described herein, a mode associated with the dormancy state or the deactivated state includes RRM, RLM, one or more Layer 1 measurements, one or more Layer 1 reports, one or more BFD measurements, one or more sounding procedures, uplink control signaling, downlink control signaling, downlink data signaling, or any combination thereof.

In some examples of the method, apparatuses, and non-transitory computer-readable medium described herein, the first cell group includes an MCG and the second cell group includes an SCG.

DETAILED DESCRIPTION

In some wireless communications systems, wireless devices may communicate in a dual connectivity (DC) configuration, in which a user equipment (UE) may communicate with a network device (e.g., a base station) via a first cell group (e.g., a master cell group (MCG)) and a second cell group (e.g., a secondary cell group (SCG)). In some cases, the UE may enter a dormancy or deactivated state with respect to the second cell group, for example based on traffic patterns, traffic types, or UE parameters (e.g., to prevent the UE from overheating). In some examples, the UE may switch from a first bandwidth part (BWP) configuration to a second BWP configuration to further reduce power consumption at the UE. It may be beneficial to configure the UE to perform a reduced set of measurements (e.g., fewer measurements than in the active state) in the second BWP to maintain a stable connection with the second cell group in the dormancy or deactivated state.

The present disclosure introduces techniques for a UE switching from a first BWP configuration to a second BWP configuration based on a trigger for transitioning from a first activity state to a second activity state with respect to a cell group (e.g., an SCG). The trigger may be an expiration of a timer at the UE, or the UE may receive control signaling indicating the transition. The second BWP configuration may be based on a mode configured at the UE associated with the second activity state. The configured mode may indicate one or more measurements the UE is to perform while in the second activity state. In some examples, the BWP configuration may include no configured BWPs based on the configured mode, for example when the UE is able to perform the indicated measurements using broadcast signals (e.g., a synchronization signal block (SSB)). In some examples, the BWP configuration may include a downlink (DL) BWP, an uplink (UL) BWP, or both, based on the indicated measurements of the configured mode.

Aspects of the disclosure are initially described in the context of wireless communications systems. Aspects of the disclosure are further illustrated by and described with reference to a timing diagram, a process flow, apparatus diagrams, system diagrams, and flowcharts that relate to techniques for switching a BWP configuration.

Figure 1:
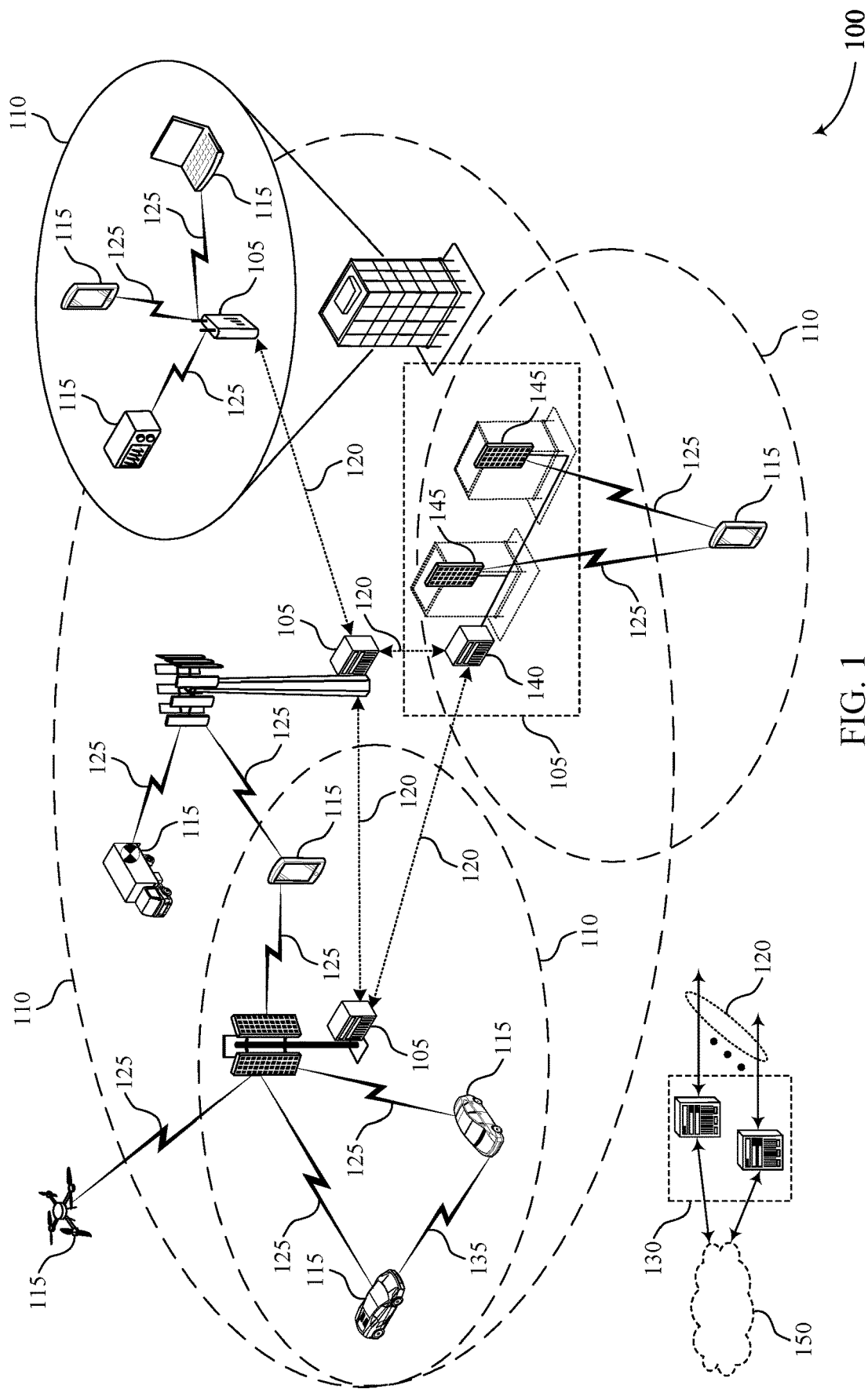
FIGS. 1 and 2 illustrate examples of wireless communications systems that support techniques for switching a bandwidth part (BWP) configuration in accordance with aspects of the present disclosure.

FIG. 1 illustrates an example of a wireless communications system 100 that supports techniques for switching a BWP configuration in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to the techniques described herein, a UE 115 may switch from a first BWP configuration to a second BWP configuration based on a trigger for transitioning from a first activity state to a second activity state with respect to a cell group (e.g., an SCG) of a base station 105. The trigger may be an expiration of a timer at the UE 115, or the UE 115 may receive control signaling from the base station 105 indicating the transition. The second BWP configuration may be based on a mode configured at the UE 115 associated with the second activity state. The configured mode may indicate one or more measurements the UE 115 is to perform while in the second activity state. In some examples, the BWP configuration may include no configured BWPs based on the configured mode, for example when the UE 115 is able to perform the indicated measurements using broadcast signals (e.g., SSB signaling). In some examples, the BWP configuration may include a DL BWP, a UL BWP, or both, based on the indicated measurements of the configured mode.

Figure 2:
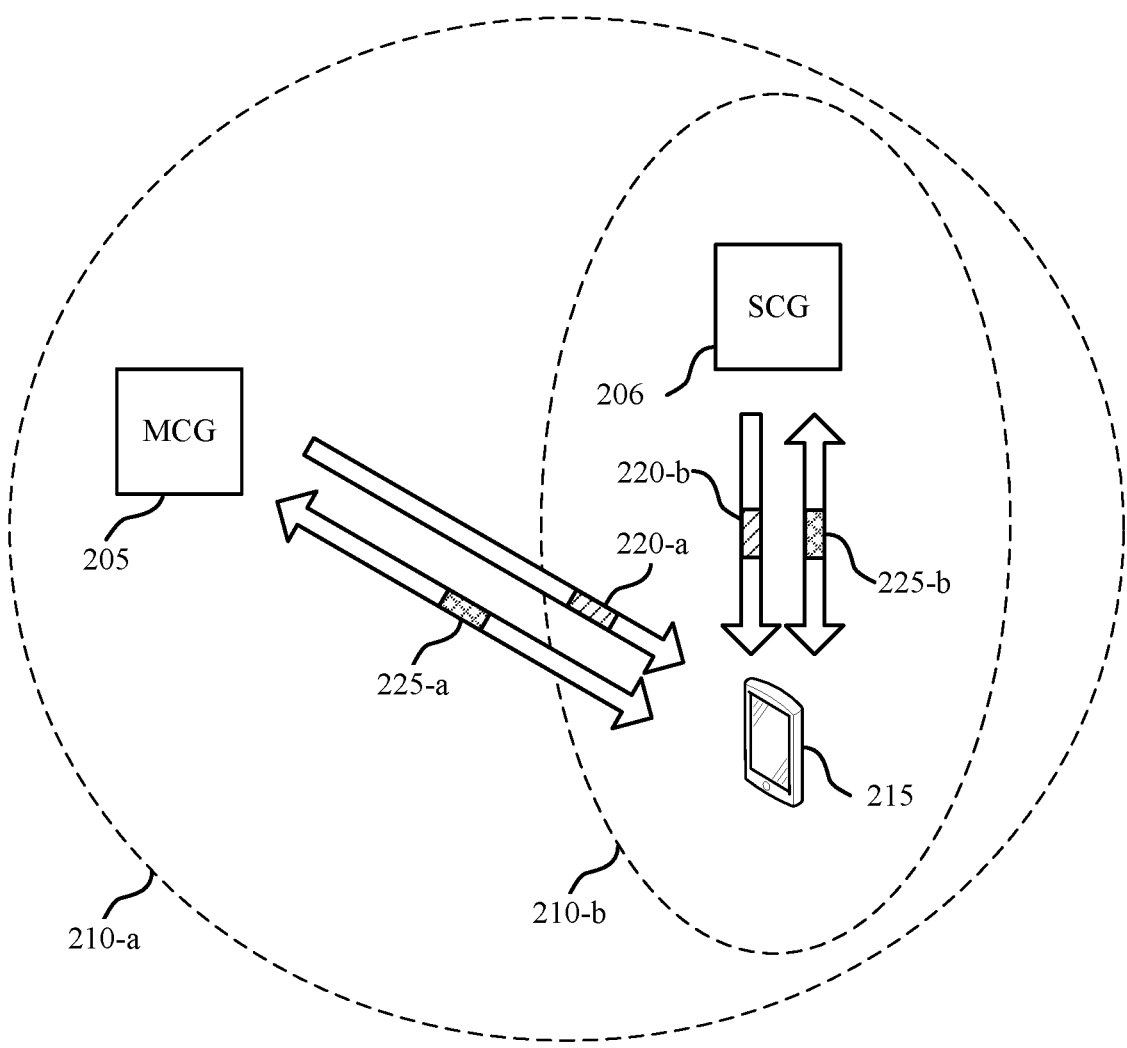

FIG. 2 illustrates an example of a wireless communications system 200 that supports techniques for switching a BWP configuration in accordance with aspects of the present disclosure. The wireless communications system 200 may implement or be implemented by aspects of the wireless communications system 100 as described with reference to FIG. 1. For example, a UE 215 may be an example of corresponding devices described with reference to FIG. 1, such as a UE 115. Cell groups such as an MCG 205 and an SCG 206 may be associated with a base station, such as a base station 105 described with reference to FIG. 1. The wireless communications system 200 may support improvements to power consumption, connection stability, and in some examples, may promote lower latency wireless communications and reduced overheating at one or more devices, among other benefits.

In some examples, UE 215 may support multi-radio access technology (RAT) DC (MR-DC) communications between UE 215 and one or more base stations. For example, UE 215 may communicate with one or more cell groups, such as MCG 205 (e.g., for communications using a first RAT of two RATs in MR-DC) and SCG 206 (e.g., for communications using a second RAT of the two RATs in MR-DC). MCG 205 may include a primary cell (PCell), or the PCell and one or more secondary cells (SCells). SCG 206 may include a primary SCell (PSCell), or the PSCell and one or more SCells. In some cases, a first base station may include MCG 205, and a second base station may include SCG 206. In some other cases, a single base station may include both MCG 205 and SCG 206. UE 215 may communicate with MCG 205 within geographic coverage area 210-*a* and geographic coverage area 210-*b*. In some examples, geographic coverage area 210-*a* may include geographic coverage area 210-*b*. UE 215 may communicate with SCG 206 within geographic coverage area 210-*b*.

Dormancy (e.g., deactivation) and activation of the SCG 206 may apply to a PSCell or the PSCell and one or more SCells of SCG 206, and may apply to frequency range (FR) 1 (FR1), FR2, or both. Activation and deactivation of SCG 206 may apply to next-generation (NG) radio access network (RAN) E-UTRA DC ((NG)EN-DC), NR-DC, or both. Activation and deactivation of SCells may apply to NR carrier aggregation (CA).

UE 215 may operate in an SCG dormancy mode of multiple SCG dormancy modes. Each mode may correspond at least to the types of measurements UE 215 may perform in that mode. For example, UE 215 may perform radio resource management (RRM) measurements in a mode which may be referred to as Mode-2. UE 215 may perform RRM and radio link monitoring (RLM) in a mode which may be referred to as Mode-1. UE 215 may perform RRM, RLM, and beam failure detection (BFD) in a mode which may be referred to as Mode 0. UE 215 may perform RRM, RLM, BFD, and layer one (L1) measurements, reports, and a sounding procedure in a mode which may be referred to as Mode 1. For example, UE 215 may transmit a physical uplink control channel (PUCCH) on a PSCell. UE 215 may perform RRM, RLM, BFD, L1 measurements, reports, and the sounding procedure in a mode which may be referred to as Mode 2. For example, UE 215 may transmit a PUCCH on the PSCell, and may receive a physical downlink control channel (PDCCH) on the PSCell. UE 215 may perform RRM, RLM, BFD, L1 measurements, reports, and the sounding procedure in a mode which may be referred to as Mode 3. For example, UE 215 may transmit a PUCCH on the PSCell, and receive both the PDCCH and a physical downlink shared channel (PDSCH) on the PSCell.

In some cases, UE 215 may transition from SCG dormancy to the active state (or vice versa) upon determining that a timer has elapsed or expired. In some other cases, UE 215 may receive a trigger message to transition from SCG dormancy to an active state, or vice versa. The trigger message may further indicate which SCG dormancy mode that UE 215 may operate according to. In some examples, UE 215 may receive the trigger message via MCG 205 or SCG 206.

In some examples during SCG dormancy, UE 215 may switch to a smaller PSCell BWP, such as no BWP, a DL BWP, a UL BWP, or both the DL BWP and the UL BWP. The type of BWP used may depend on activities (e.g., RRM, RLM, BFD, L1 measurements, and the like) performed in the PSCell during SCG dormancy. For example, when operating in SCG dormancy Mode-2, Mode-1, and Mode 0, if UE 215 uses SSBs for measurements and no DL channel is enabled, or no UL channel is enabled, or neither are enabled, then UE 215 may be configured to switch to the no BWP configuration for communication with the PSCell. In some other examples, when operating in SCG dormancy Mode-2, Mode-1, and Mode 0, if UE 215 makes channel state information reference signal (CSI-RS) measurements for RRM, RLM, and BFD, then UE 215 may be configured to switch to the DL BWP configuration for communication with the PSCell. In some other examples, when operating in SCG dormancy Mode 1, if UE 215 uses SSBs for RRM, RLM, BFD, and L1 measurements, then UE 215 may be configured to switch to the UL BWP configuration for communication with the PSCell. UE 215 may transmit a PDCCH, a sounding reference signal (SRS), or both, on the UL channel. In some other examples, when operating in SCG dormancy Mode 2 and Mode 3, if both UL and DL channels are used on the PSCell, UE 215 may switch to the DL BWP and UL BWP configuration at the PSCell. In some other examples, when operating in SCG dormancy Mode 1, if UE 215 uses a CSI-RS for RRM, RLM, BFD, and L1 measurements, then UE 215 may be configured to switch to the DL BWP and UL BWP configuration for communication with the PSCell.

In some examples, during SCG dormancy, UE 215 may switch to a smaller SCell BWP such as the DL BWP. For example, if UE 215 uses the CSI-RS for measurements, then UE 215 may be configured to switch to the DL BWP configuration for communication with one or more SCells.

In some cases, the BWP used during the SCG dormancy state may overlap or be a subset of a BWP used during an SCG non-dormant state (e.g., an active state). In such cases, UE 215 may apply measurements (e.g., measurements performed in the SCG dormancy state) to the active state. For example, UE 215 may perform L1 measurements in the SCG dormancy state. Upon transitioning to the active state, UE 215 may apply or carry over measurement information from the L1 measurements performed during the SCG dormancy state to the active state, which may result in a faster transition from the SCG dormancy state to the active state, a more stable connection, or both. In some other cases, if a network configures non-overlapping BWPs for UE 215 with respect to the SCG dormancy state and the active state, UE 215 may perform network synchronization operations such as DL synchronization, timing, and beam management before accessing the network.

In some examples, UE 215 may receive an implicit message to switch BWPs. For example, UE 215 may receive an SCG trigger message to transition from the SCG dormancy state to the active state (or vice versa), and UE 215 may perform BWP switching based on the trigger message. The network (e.g., one or more base stations, or the like) may configure UE 215 to perform BWP switching if UE 215 receives the SCG trigger message. In some cases, UE 215 may switch to a pre-configured non-dormant DL BWP, UL BWP, or both. The pre-configured BWP may be different or the same between the PSCell and one or more SCells. In some examples, UE 215 may receive the SCG trigger message via MCG 205 or SCG 206. In some examples, UE 215 may receive the implicit message in a PDCCH, a MAC control element (MAC-CE), a downlink control information (DCI) message, or other control signaling, or a combination thereof.

In some examples, UE 215 may receive an explicit message to switch BWPs. For example, UE 215 may receive an explicit message to trigger a BWP switch on the UL, DL, or both, to BWPs indicated or included in the explicit message. Additionally or alternatively, the explicit message may carry indices of pre-configured BWPs in a pre-configured list of BWPs (e.g., a list stored at UE 215). The network (e.g., one or more base stations), or another device, may signal the pre-configured list of BWPs, which may include a set of indices corresponding to BWP configurations, to UE 215 in a BWP configuration message 220 (e.g., via a DCI message, RRC signaling, a MAC-CE, or the like) before UE 215 transitions states (e.g., moves into the SCG dormancy state). In some cases, the explicit message may be a single message indicating, for example, two BWPs, and to switch to the first BWP upon transitioning from a first state to a second state (e.g., from the SCG dormancy state to the active state), and to switch to the second BWP upon transitioning from the second state back to the first state. In some examples, the single explicit message may indicate a same BWP or different BWPs for the PSCell and the SCells in SCG 206. In some cases, the explicit message may include or be divided into separate messages. For example, the separate messages may include a message for a state change (e.g., from the SCG dormancy state to the active state, or vice versa), and a different message indicating UE 215 is to switch BWPs. In some examples, the separate messages may include a message indicating UE 215 is to switch from a first BWP to a second BWP upon transitioning from a first state to a second state, and a different message indicating UE 215 is to switch back from the second BWP to the first BWP upon transitioning back from the second state to the first state. In some examples, the separate messages may include a message indicating one or more BWPs for the PSCell of SCG 206, and one or more different messages indicating one or more BWPs for the SCells of SCG 206.

In some examples, the implicit message to switch BWPs, the one or more explicit message to switch BWPs, or both, may be transmitted to UE 215 based on a current SCG dormancy mode (e.g., Mode-2, Mode-1, Mode 0, Mode 1, Mode 2, or Mode 3). For example, if UE 215 is operating according to SCG dormancy Mode-2, Mode-1, Mode 0, or Mode 1, a base station may transmit the implicit message, the one or more explicit messages, or both via MCG 205.

In some examples, if UE 215 is operating according to SCG dormancy Mode 2 or Mode 3, then the base station may transmit the implicit message, the one or more explicit messages, or both, via MCG 205 or one or more DL channels (e.g., PDCCH for Mode 2, or PDCCH, PDSCH, or both, for Mode 3). In some cases, the base station may transmit an SCG trigger message to transition from a first state (e.g., an SCG dormancy state) to a second state (e.g., an active state) via MCG 205, and may transmit the implicit message, the one or more explicit messages, or both, via one or more downlink messages if UE 215 is operating according to SCG dormancy Mode 2 or Mode 3.

Upon switching BWP configurations, UE 215 may communicate with MCG 205, SCG 206, or both, using communications 225. For example, UE 215 may communicate with MCG 205 using communications 225-*a*, and may communicate with SCG 206 using communications 225-*b*.

Figure 3:
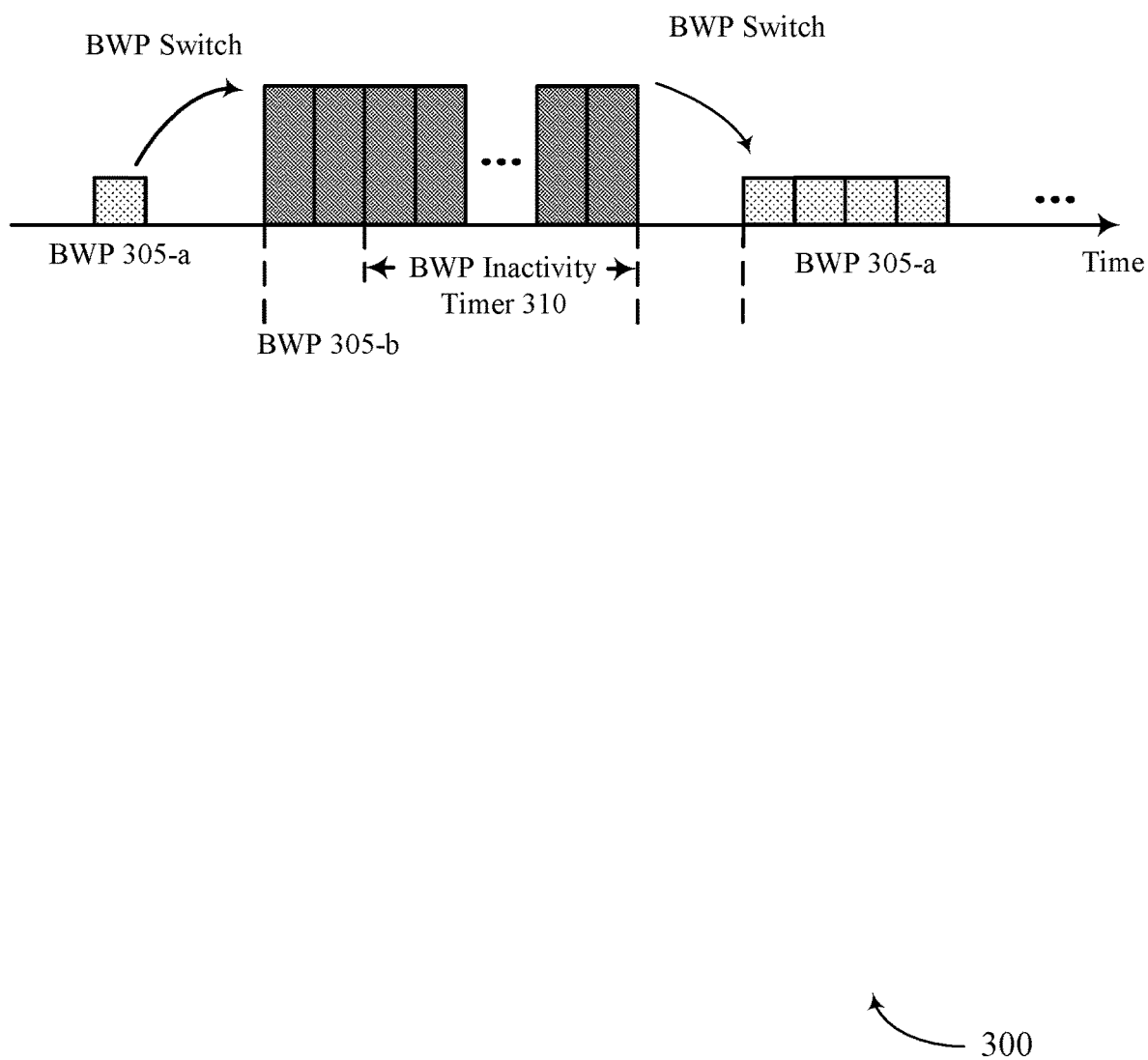
FIG. 3 illustrates an example of a timing diagram that supports techniques for switching a BWP configuration in accordance with aspects of the present disclosure.

FIG. 3 illustrates an example of a timing diagram 300 that supports techniques for switching a BWP configuration in accordance with aspects of the present disclosure. The timing diagram 300 may implement or be implemented by aspects of the wireless communications system 100, wireless communications system 200, or both, as described with reference to FIG. 1 and FIG. 2. The timing diagram 300 may illustrate one or more BWP switching processes.

BWPs 305 may include a set (e.g., a contiguous set) of physical resource blocks (PRBs) selected from a subset (e.g., a contiguous subset) of common resource blocks for a numerology ($\mu$) on a given carrier. A UE may use a large BWP 305 to transmit or receive large quantities of data, and may use a smaller BWP 305 to transmit or receive smaller quantities of data. In some cases, BWPs 305 may be designated as UL BWPs 305 or DL BWPs 305. That is, the UE may transmit UL signaling using a UL BWP 305, and may receiving DL signaling using a DL BWP 305.

The UE may be configured to switch from a first BWP 305 to a smaller (e.g., reduced) BWP 305 to save power. That is, a network device (e.g., a base station) may determine that a small quantity of data is being transmitted, received, or both, at the UE and may configure the UE to switch to a smaller BWP 305 to save power, as using the large BWP may be inefficient. For example, the UE may be configured to switch from BWP 305-*b*, which may be an example of a large BWP 305, to BWP 305-*a*, which may be an example of a smaller BWP 305, to save power. BWP 305-*a* may be associated with a state with low or no data activity. For example, the UE may be configured to switch from BWP 305-*b* to BWP 305-*a* before, during, or after entering SCG dormancy. In some examples, the UE may be configured to switch from BWP 305-*a* to BWP 305-*b* upon exiting SCG dormancy, or upon entering an active state. BWP 305-*b* may be associated with a state with higher data activity than the state with low or no data activity.

Control signaling (e.g., a DCI message, RRC signaling, a MAC-CE, or the like) may trigger the UE to perform a BWP switch. For example, a DCI message from a network device may trigger the UE to switch from BWP 305-*a* to BWP 305-*b*, or from BWP 305-*b* to BWP 305-*a*. Additionally or alternatively, a timer may trigger the UE to perform the BWP switch. For example, a BWP inactivity timer 310 may start, progress, and end, and the UE may initiate the BWP switch from BWP 305-*b* to BWP 305-*a*, or from BWP 305-*a* to BWP 305-*b*, after determining that the BWP inactivity timer 310 has expired.

In some examples, the UE may be able to save power by transitioning (e.g., switching) from a DL non-dormant (e.g., large) BWP 305 to a dormant (e.g., smaller) BWP 305 when in an SCell dormancy state, which may be different from SCG dormancy (e.g., SCell dormancy may include dormancy of one SCell). In some other examples, the UE may transition from a dormant BWP 305 to a DL non-dormant BWP 305 upon exiting the SCell dormancy state (e.g., during non-dormant states). In some cases, the UE may also be able to perform BWP switching during SCG dormancy states or during non-dormant states.

For transitions from the non-dormant BWP 305 to the dormant BWP 305, a UE may either receive a control message (e.g., a DCI message, or the like) to initiate the transition, or may transition based on a timer. In examples where the UE receives the control message, the UE may receive a message including an index pointing to the dormant BWP 305 (e.g., an index dormantBWP-Id) from a pre-configured list of BWPs 305. In examples where the UE transitions based on a timer, the UE may enter the dormant BWP 305 after a duration of time with low or no data activity and may transition to a default BWP 305.

For transitions from the dormant BWP 305 to the non-dormant BWP 305, the UE may receive a different control message (e.g., a different DCI message) to initiate the transition. In such examples, the UE may receive a message including an index pointing to the non-dormant (e.g., active)

BWP (e.g., an index firstOutsideActiveTimeBWP-Id) from the pre-configured list of BWPs 305.

Figure 4:
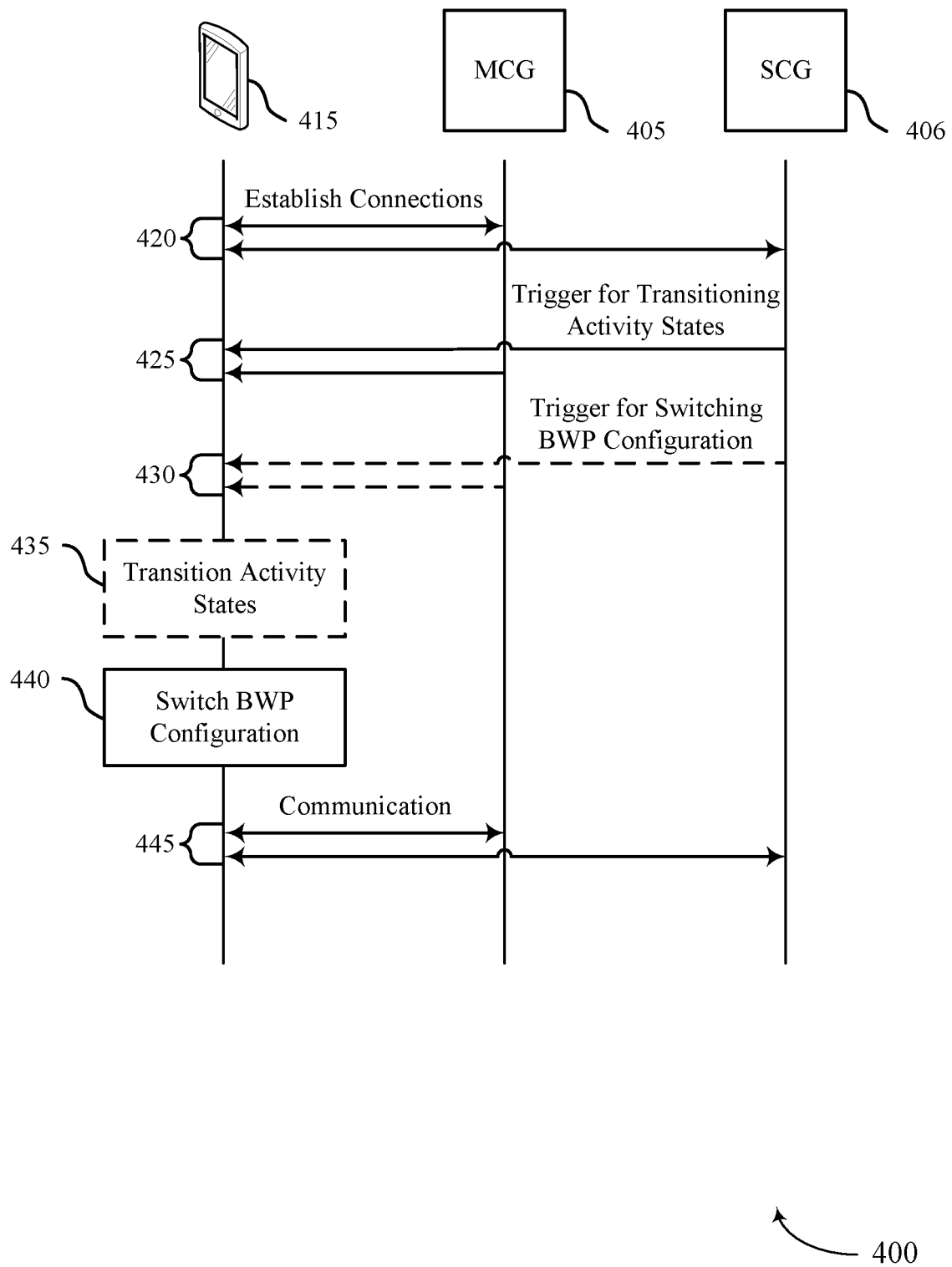
FIG. 4 illustrates an example of a process flow that supports techniques for switching a BWP configuration in accordance with aspects of the present disclosure.

FIG. 4 illustrates an example of a process flow 400 that supports techniques for switching a BWP configuration in accordance with aspects of the present disclosure. The process flow 400 may implement aspects of the wireless communications system 100, wireless communications system 200, or both, or may be implemented by aspects of the wireless communications system 100, wireless communications system 200, or both, as described with reference to FIG. 1 and FIG. 2. In some examples, the process flow 400 may include example operations associated with one or more of a UE 415, an MCG 405, and an SCG 406, which may be examples of corresponding devices described with reference to FIGS. 1 and 2. In the following description of the process flow 400, the operations between UE 415, MCG 405, and SCG 406 may be performed in a different order than the example order shown, or the operations performed by the UE 415, MCG 405, and SCG 406 may be performed in different orders or at different times. Some operations may also be omitted from the process flow 400, and other operations may be added to the process flow 400.

At 420, UE 415 may establish a connection with cells of a first cell group and a second cell group according to a dual connectivity configuration. For example, UE 415 may establish an MR-DC connection with MCG 405 and SCG 406. UE 415 may receive a pre-configured list of BWPs, which may include a set of indices corresponding to BWP configurations, (e.g., via a DCI message, RRC signaling, a MAC-CE, or the like) before UE 415 transitions states (e.g., moves into the SCG dormancy state).

At 425, UE 415 may receive control signaling including a trigger indicating that UE 415 is to transition from a first activity state to a second activity state, where switching from a first BWP configuration to a second BWP configuration may be based on the received control signaling. The control signaling may indicate that UE 415 is to transition from an SCG dormancy mode to an active mode, or vice versa. The control signaling may further indicate an SCG dormancy mode of multiple SCG dormancy modes that UE 415 may use for communicating with the SCG 406.

In some examples, at 430, UE 415 may receive second control signaling including a second trigger indicating that UE 415 is to switch from the first BWP configuration to the second BWP configuration, where switching from the first BWP configuration to the second BWP configuration may be based on the received second control signaling. The second control signaling may be an implicit message, or an explicit message. For example, the control signaling including the activity state transition trigger may additionally trigger the UE 415 to switch BWP configurations. The explicit message may be a single message indicating, for example, two BWPs, and to switch to the first BWP upon transitioning from a first state to a second state (e.g., from the SCG dormancy state to the active state), and to switch to the second BWP upon transitioning from the second state back to the first state. In some examples, the single explicit message may indicate a same BWP or different BWPs for a PSCell and SCells in SCG 406. In some cases, the explicit message may include or be divided into separate messages. For example, the separate messages may include a message for a state change (e.g., from the SCG dormancy state to the active state, or vice versa), and a different message indicating UE 415 is to switch BWPs. In some examples, the separate messages may include a message indicating the UE 415 is to switch from a first BWP to a second BWP upon transitioning from a first state to a second state, and a different message indicating the UE 415 is to switch back from the second BWP to the first BWP upon transitioning back from the second state to the first state. In some examples, the separate messages may include a message indicating one or more BWPs for the PSCell of SCG 406, and one or more different messages indicating one or more BWPs for the SCells of SCG 406.

In some examples, at 435, UE 415 may transition from the first activity state to the second activity state based on the trigger, where communicating with a cell (e.g., a PSCell) of the SCG 406 may be based on transitioning from the first activity state to the second activity state. In some examples, the first activity state may be the SCG dormancy state, and the second activity state may be the active state, or vice versa.

At 440, UE 415 may switch from the first BWP configuration to the second BWP configuration based on the trigger indicating that UE 415 is to transition from the first activity state to the second activity state, the first activity state and the second activity state corresponding to communications with the second cell group. In examples where UE 415 transitions to an SCG dormancy state, UE 415 may switch to a smaller BWP configuration, which may include no BWP, a DL BWP, a UL BWP, or both, depending on activities (e.g., RRM, RLM, BFD, L1 measurements, and the like) performed in communication with the PSCell during SCG dormancy. In examples where UE 415 transitions to an active state, UE 415 may switch to a larger BWP configuration.

At 445, UE 415 may communicate with a cell (e.g., the PSCell) of the SCG 406 according to the second activity state and the second BWP configuration. In some examples, the second activity state may be the SCG dormancy state and the second BWP configuration may be the smaller BWP configuration. In some other examples, the second activity state may be the active state and the second BWP configuration may be the larger BWP configuration. The operations performed at the UE 415, the MCG 405, and the SCG 406 may improve efficiency and reliability of communications in a DC configuration, among other benefits.

Figure 5:
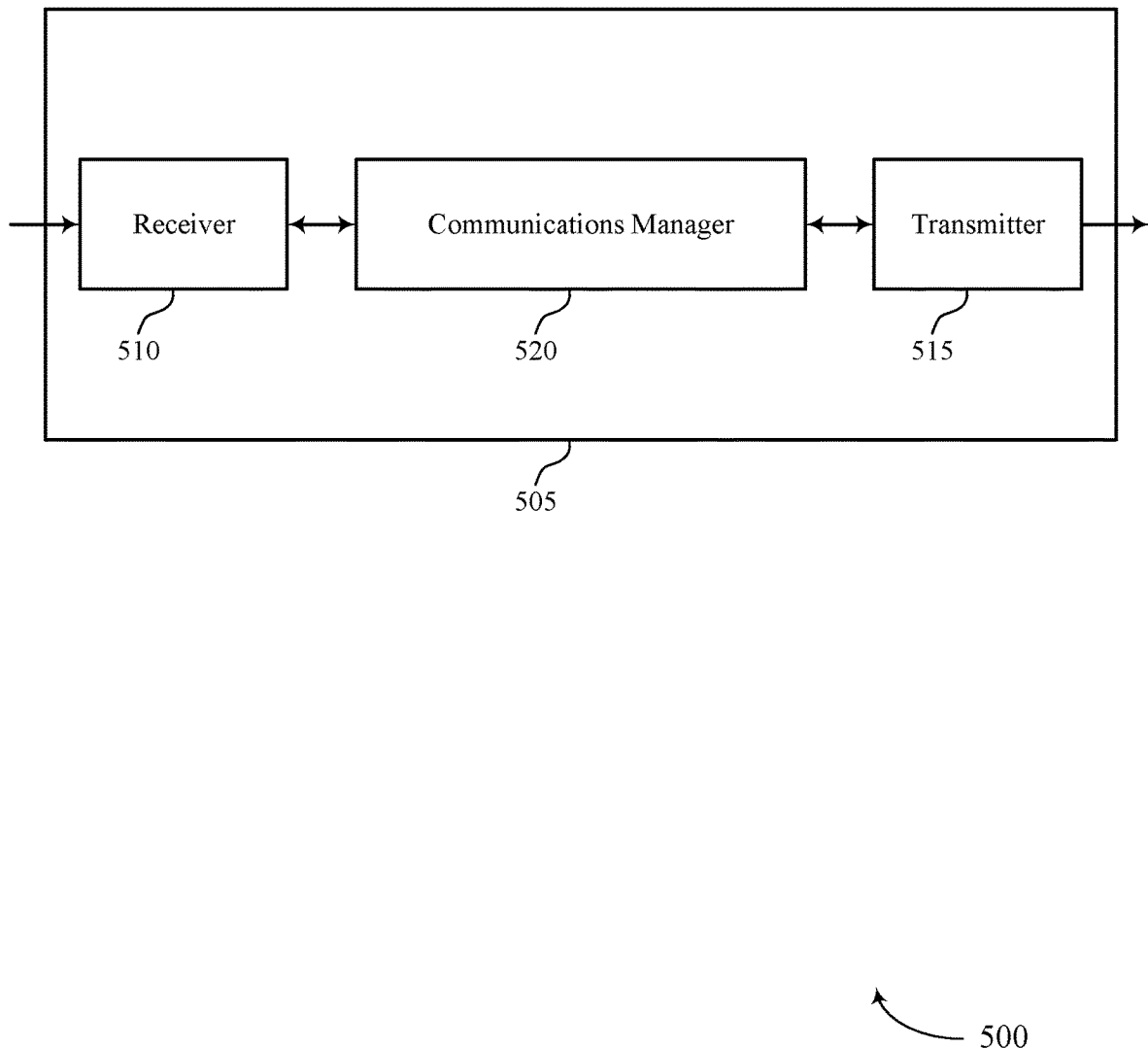
FIGS. 5 and 6 show block diagrams of devices that support techniques for switching a BWP configuration in accordance with aspects of the present disclosure.

FIG. 5 shows a block diagram 500 of a device 505 that supports techniques for switching a BWP configuration in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for switching a BWP configuration). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for switching a BWP configuration). In some examples, the transmitter 515 may be co-located with a receiver 510 in a transceiver component. The transmitter 515 may utilize a single antenna or a set of multiple antennas.

The communications manager 520, the receiver 510, the transmitter 515, or various combinations thereof or various components thereof may be examples of means for performing various aspects of techniques for switching a BWP configuration as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for establishing a first connection with at least a first cell of a first cell group. The communications manager 520 may be configured as or otherwise support a means for establishing a second connection with at least a second cell of a second cell group. The communications manager 520 may be configured as or otherwise support a means for switching from a first BWP configuration to a second BWP configuration based on a trigger indicating that the UE is to transition from a first activity state to a second activity state, the first activity state and the second activity state corresponding to communications with the second cell group. The communications manager 520 may be configured as or otherwise support a means for communicating with the second cell of the second cell group according to the second activity state and the second BWP configuration.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and more efficient utilization of communication resources.

Figure 6:
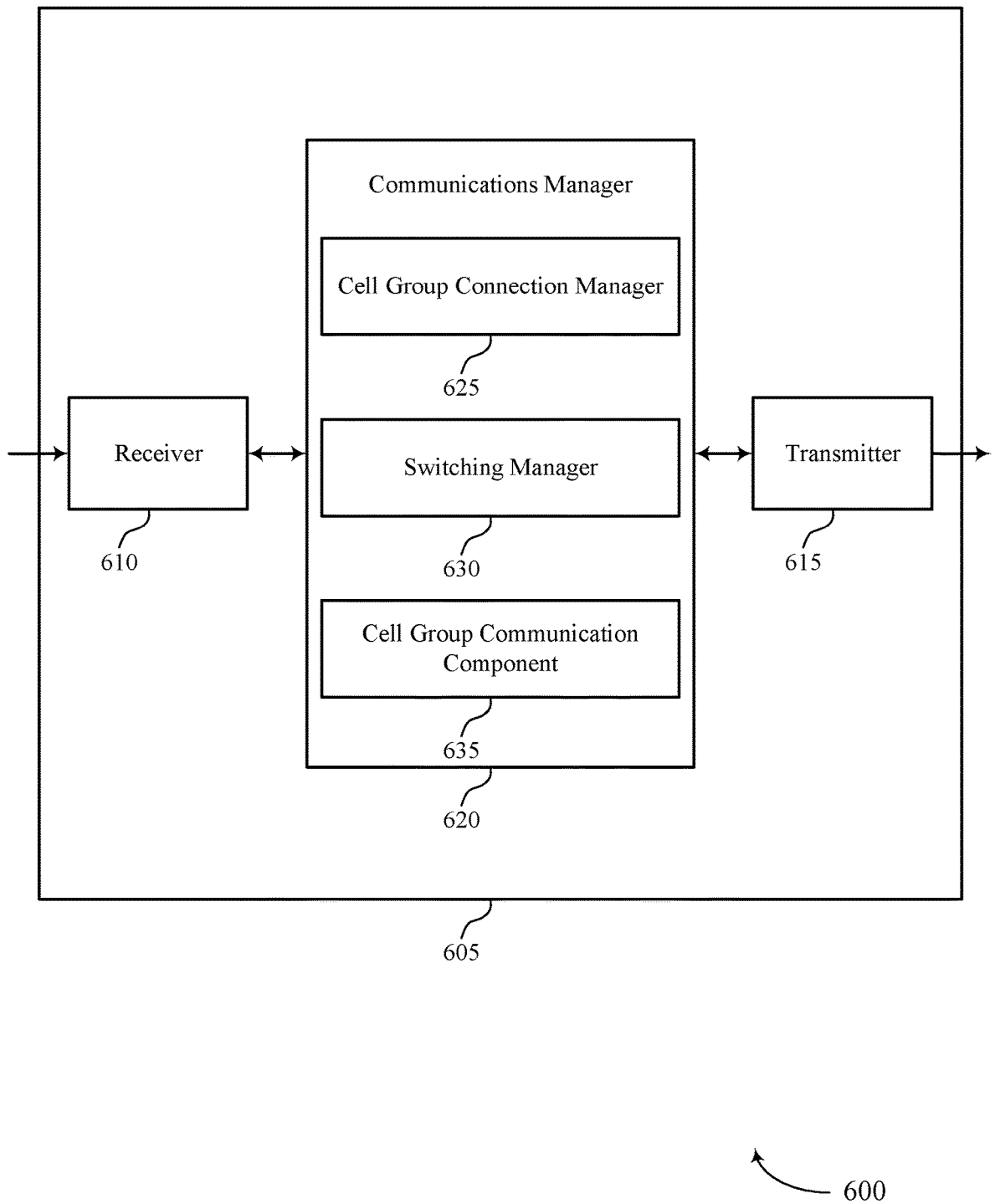

FIG. 6 shows a block diagram 600 of a device 605 that supports techniques for switching a BWP configuration in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for switching a BWP configuration). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for switching a BWP configuration). In some examples, the transmitter 615 may be co-located with a receiver 610 in a transceiver component. The transmitter 615 may utilize a single antenna or a set of multiple antennas.

The device 605, or various components thereof, may be an example of means for performing various aspects of techniques for switching a BWP configuration as described herein. For example, the communications manager 620 may include a cell group connection manager 625, a switching manager 630, a cell group communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The cell group connection manager 625 may be configured as or otherwise support a means for establishing a first connection with at least a first cell of a first cell group. The cell group connection manager 625 may be configured as or otherwise support a means for establishing a second connection with at least a second cell of a second cell group. The switching manager 630 may be configured as or otherwise support a means for switching from a first BWP configuration to a second BWP configuration based on a trigger indicating that the UE is to transition from a first activity state to a second activity state, the first activity state and the second activity state corresponding to communications with the second cell group. The cell group communication component 635 may be configured as or otherwise support a means for communicating with the second cell of the second cell group according to the second activity state and the second BWP configuration.

Figure 7:
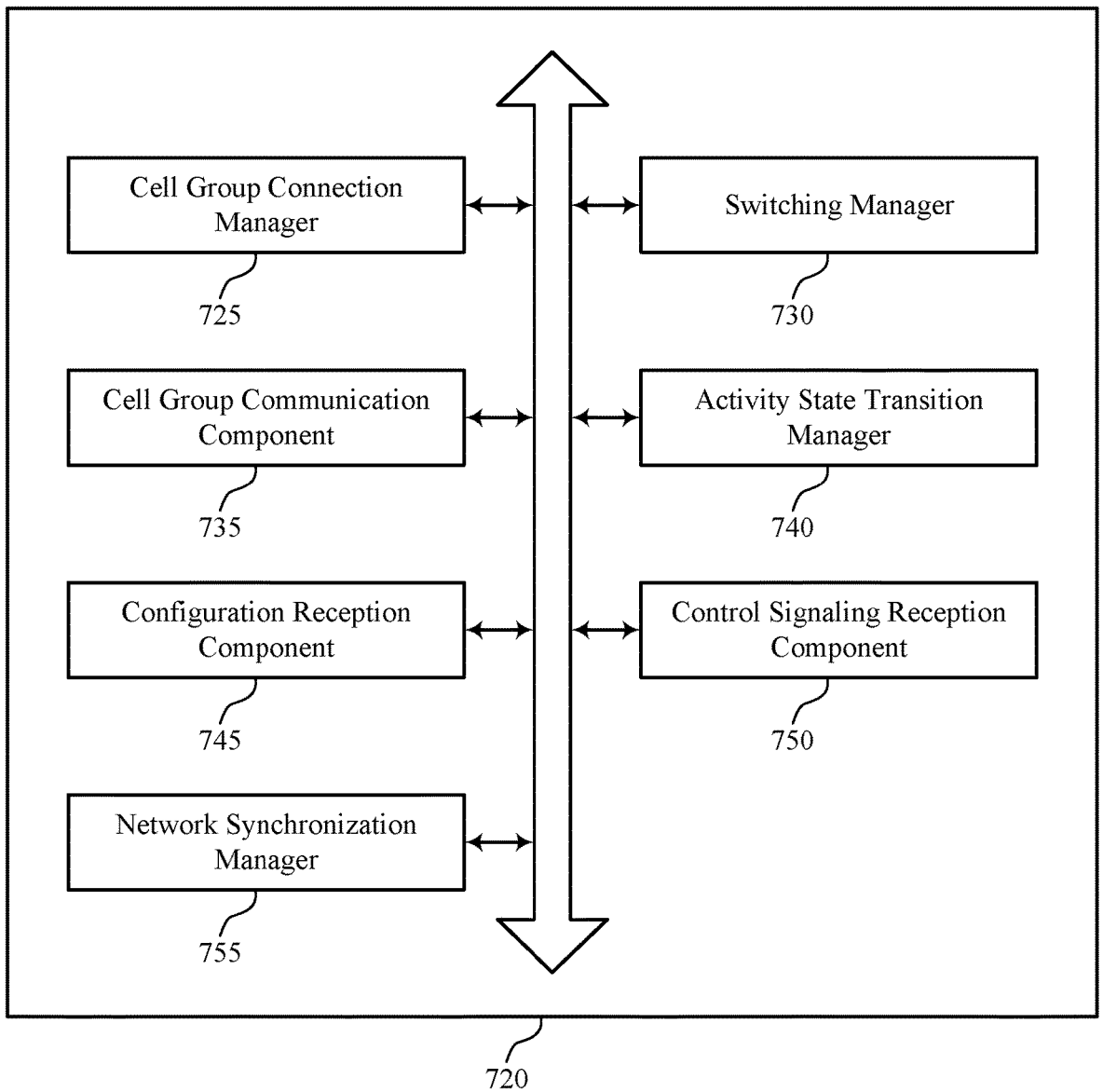
FIG. 7 shows a block diagram of a communications manager that supports techniques for switching a BWP configuration in accordance with aspects of the present disclosure.

FIG. 7 shows a block diagram 700 of a communications manager 720 that supports techniques for switching a BWP configuration in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for switching a BWP configuration as described herein. For example, the communications manager 720 may include a cell group connection manager 725, a switching manager 730, a cell group communication component 735, an activity state transition manager 740, a configuration reception component 745, a control signaling reception component 750, a network synchronization manager 755, or any combination thereof. Each of these components may communicate, directly or indirectly, with one another (e.g., via one or more buses).

The communications manager 720 may support wireless communication at a UE in accordance with examples as disclosed herein. The cell group connection manager 725 may be configured as or otherwise support a means for establishing a first connection with at least a first cell of a first cell group. In some examples, the cell group connection manager 725 may be configured as or otherwise support a means for establishing a second connection with at least a second cell of a second cell group. The switching manager 730 may be configured as or otherwise support a means for switching from a first BWP configuration to a second BWP configuration based on a trigger indicating that the UE is to transition from a first activity state to a second activity state, the first activity state and the second activity state corresponding to communications with the second cell group. The cell group communication component 735 may be configured as or otherwise support a means for communicating with the second cell of the second cell group according to the second activity state and the second BWP configuration.

In some examples, the activity state transition manager 740 may be configured as or otherwise support a means for transitioning from the first activity state to the second activity state based on the trigger indicating that the UE is to transition from the first activity state to the second activity state, where communicating with the second cell of the second cell group is based on transitioning from the first activity state to the second activity state.

In some examples, the configuration reception component 745 may be configured as or otherwise support a means for receiving a configuration message indicating a set of indices, each index associated with a respective BWP configuration of a set of BWP configurations, where a first index of the set of indices is associated with the first BWP configuration and a second index of the set of indices is associated with the second BWP configuration.

In some examples, the switching manager 730 may be configured as or otherwise support a means for determining an expiration of a timer at the UE, where the trigger indicating that the UE is to transition from the first activity state to the second activity state includes the determined expiration.

In some examples, the control signaling reception component 750 may be configured as or otherwise support a means for receiving control signaling including the trigger indicating that the UE is to transition from the first activity state to the second activity state, where switching from the first BWP configuration to the second BWP configuration is based on the received control signaling.

In some examples, the received control signaling includes a second trigger that indicates that the UE is to switch from the first BWP configuration to the second BWP configuration.

In some examples, the control signaling reception component 750 may be configured as or otherwise support a means for receiving second control signaling including a second trigger indicating that the UE is to switch from the first BWP configuration to the second BWP configuration, where switching from the first BWP configuration to the second BWP configuration is based on the received second control signaling.

In some examples, the received control signaling is received via a cell of the first cell group.

In some examples, the received control signaling is received in a PDCCH transmission, a MAC-CE, a DCI message, or any combination thereof.

In some examples, the network synchronization manager 755 may be configured as or otherwise support a means for performing one or more network synchronization operations, where communicating with the second cell of the second cell group is based on the performed one or more network synchronization operations.

In some examples, a first BWP associated with the first BWP configuration at least partially overlaps with a second BWP associated with the second BWP configuration.

In some examples, the first BWP configuration includes a first uplink BWP, a first downlink BWP, or both. In some examples, the second BWP configuration includes a second uplink BWP, a second downlink BWP, or both.

In some examples, each of the first activity state and the second activity state includes a dormancy state, a deactivated state, or an active state.

In some examples, a mode associated with the dormancy state or the deactivated state includes RRM, RLM, one or more Layer 1 measurements, one or more Layer 1 reports, one or more BFD measurements, one or more sounding procedures, uplink control signaling, downlink control signaling, downlink data signaling, or any combination thereof.

In some examples, the first cell group includes a master cell group and the second cell group includes a secondary cell group.

Figure 8:
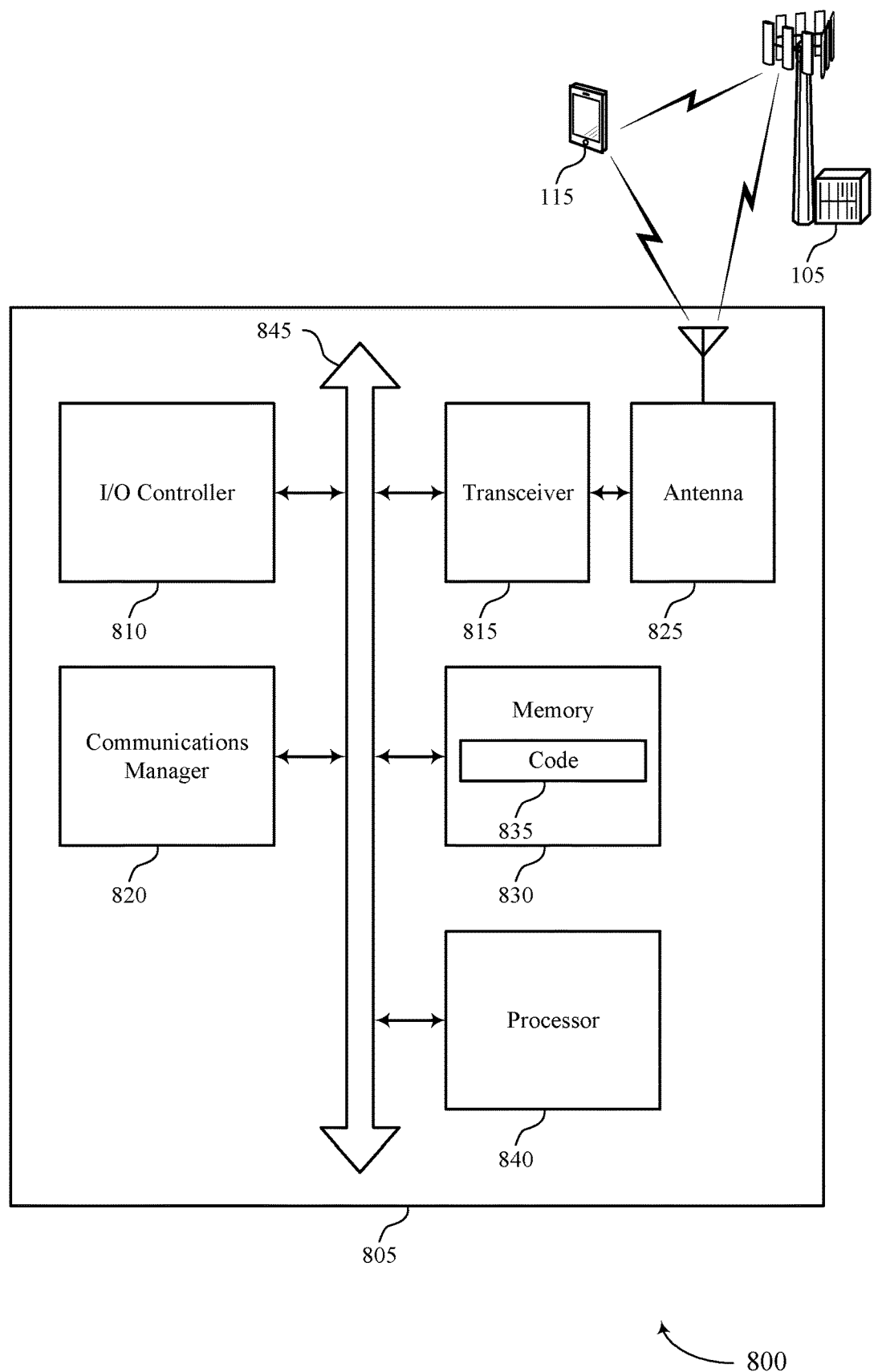
FIG. 8 shows a diagram of a system including a device that supports techniques for switching a BWP configuration in accordance with aspects of the present disclosure.

FIG. 8 shows a diagram of a system 800 including a device 805 that supports techniques for switching a BWP configuration in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for switching a BWP configuration). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for establishing a first connection with at least a first cell of a first cell group. The communications manager 820 may be configured as or otherwise support a means for establishing a second connection with at least a second cell of a second cell group. The communications manager 820 may be configured as or otherwise support a means for switching from a first BWP configuration to a second BWP configuration based on a trigger indicating that the UE is to transition from a first activity state to a second activity state, the first activity state and the second activity state corresponding to communications with the second cell group. The communications manager 820 may be configured as or otherwise support a means for communicating with the second cell of the second cell group according to the second activity state and the second BWP configuration.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for switching a BWP configuration as described herein, or the processor 840 and the memory 830 may be otherwise configured to perform or support such operations.

Figure 9:
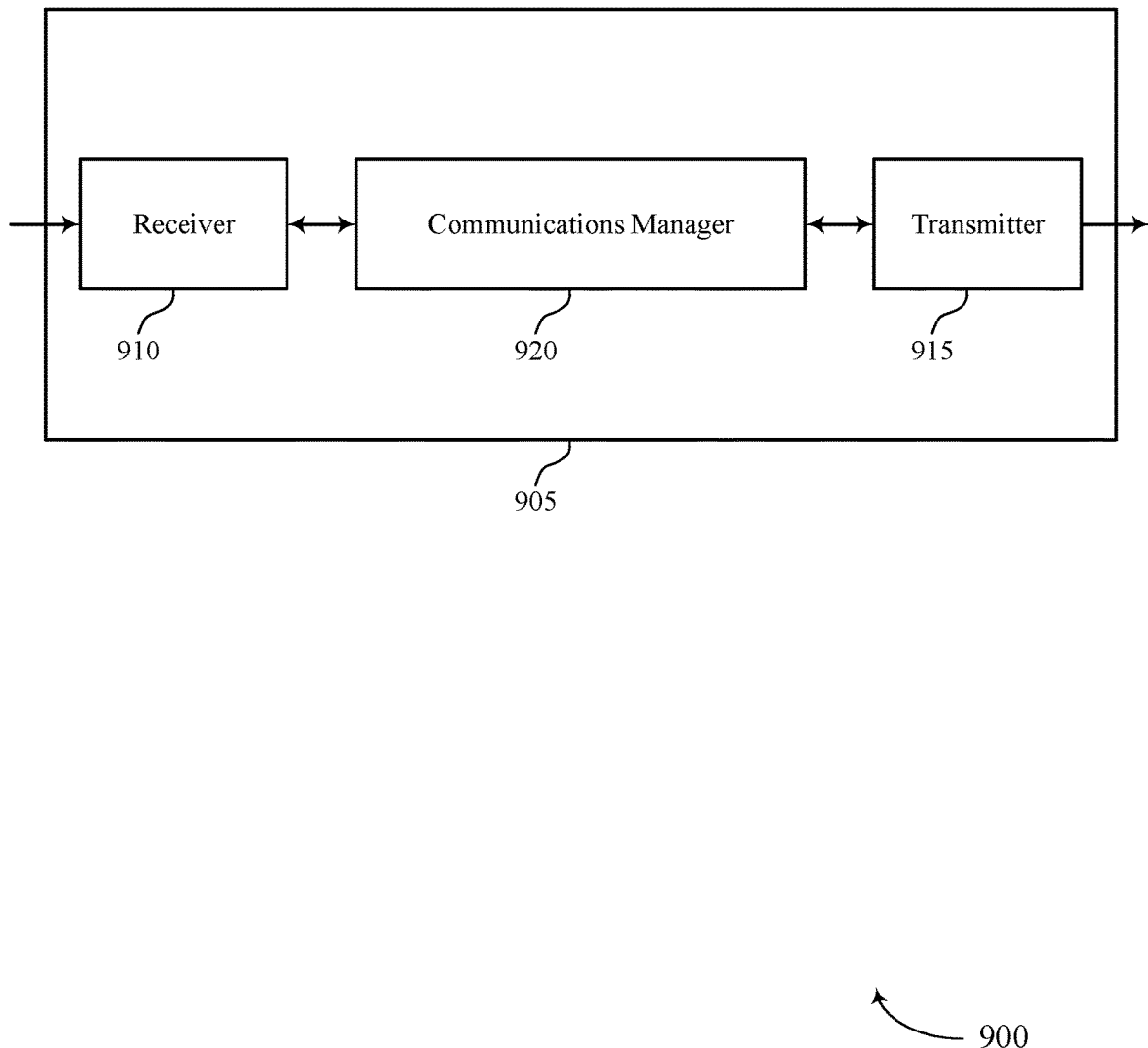
FIGS. 9 and 10 show block diagrams of devices that support techniques for switching a BWP configuration in accordance with aspects of the present disclosure.

FIG. 9 shows a block diagram 900 of a device 905 that supports techniques for switching a BWP configuration in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for switching a BWP configuration). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for switching a BWP configuration). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of techniques for switching a BWP configuration as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for establishing a first connection with a UE via at least a first cell of a first cell group. The communications manager 920 may be configured as or otherwise support a means for establishing a second connection with the UE via at least a second cell of a second cell group. The communications manager 920 may be configured as or otherwise support a means for determining that the UE has switched from a first BWP configuration to a second BWP configuration based on a trigger indicating that the UE is to transition from a first activity state to a second activity state, the first activity state and the second activity state corresponding to communications with the second cell group. The communications manager 920 may be configured as or otherwise support a means for communicating with the UE via the second cell of the second cell group according to the second activity state and the second BWP configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing, reduced power consumption, and more efficient utilization of communication resources.

Figure 10:
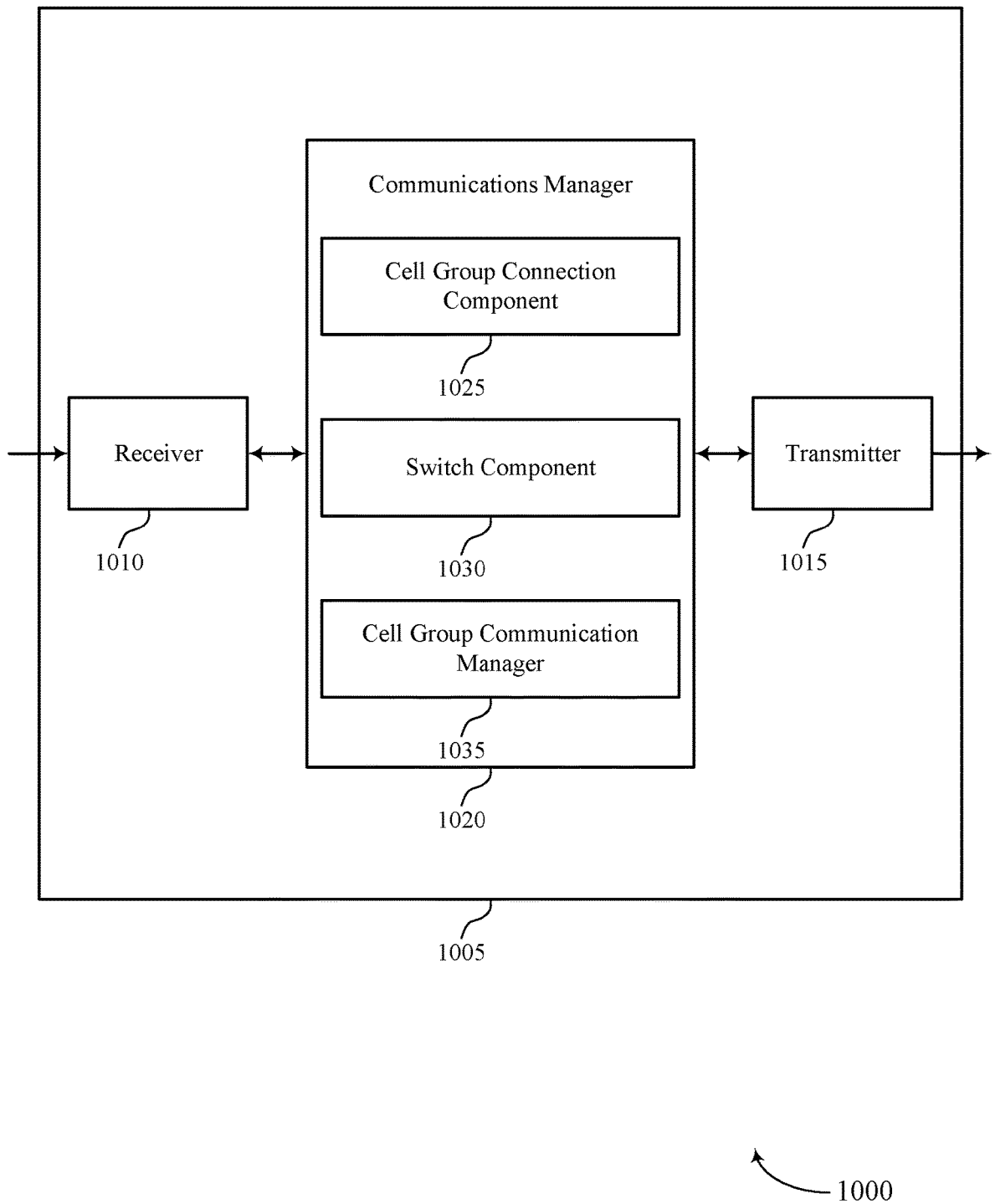

FIG. 10 shows a block diagram 1000 of a device 1005 that supports techniques for switching a BWP configuration in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for switching a BWP configuration). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for switching a BWP configuration). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of techniques for switching a BWP configuration as described herein. For example, the communications manager 1020 may include a cell group connection component 1025, a switch component 1030, a cell group communication manager 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The cell group connection component 1025 may be configured as or otherwise support a means for establishing a first connection with a UE via at least a first cell of a first cell group. The cell group connection component 1025 may be configured as or otherwise support a means for establishing a second connection with the UE via at least a second cell of a second cell group. The switch component 1030 may be configured as or otherwise support a means for determining that the UE has switched from a first BWP configuration to a second BWP configuration based on a trigger indicating that the UE is to transition from a first activity state to a second activity state, the first activity state and the second activity state corresponding to communications with the second cell group. The cell group communication manager 1035 may be configured as or otherwise support a means for communicating with the UE via the second cell of the second cell group according to the second activity state and the second BWP configuration.

Figure 11:
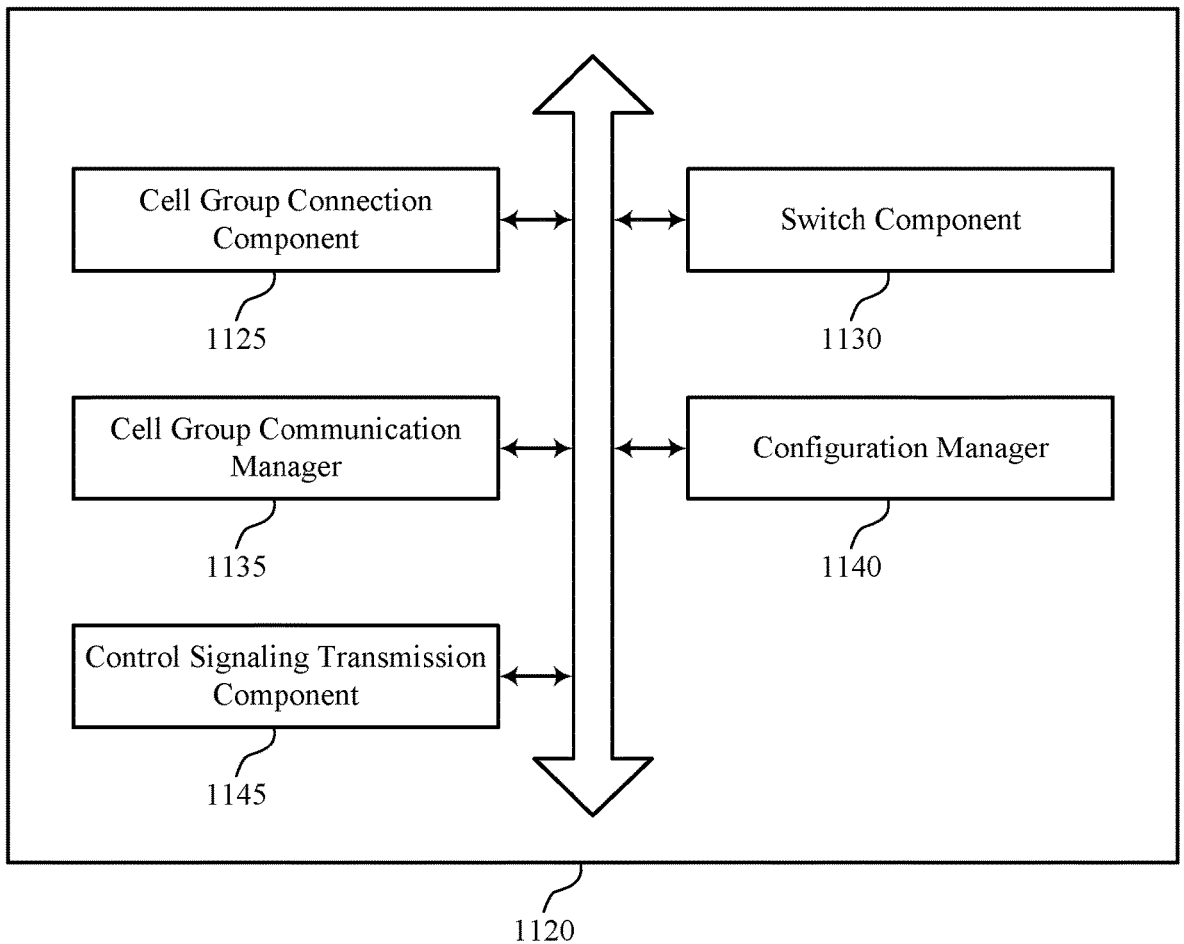
FIG. 11 shows a block diagram of a communications manager that supports techniques for switching a BWP configuration in accordance with aspects of the present disclosure.

FIG. 11 shows a block diagram 1100 of a communications manager 1120 that supports techniques for switching a BWP configuration in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for switching a BWP configuration as described herein. For example, the communications manager 1120 may include a cell group connection component 1125, a switch component 1130, a cell group communication manager 1135, a configuration manager 1140, a control signaling transmission component 1145, or any combination thereof. Each of these components may communicate, directly or indirectly, with one another (e.g., via one or more buses).

The communications manager 1120 may support wireless communication at a base station in accordance with examples as disclosed herein. The cell group connection component 1125 may be configured as or otherwise support a means for establishing a first connection with a UE via at least a first cell of a first cell group. In some examples, the cell group connection component 1125 may be configured as or otherwise support a means for establishing a second connection with the UE via at least a second cell of a second cell group. The switch component 1130 may be configured as or otherwise support a means for determining that the UE has switched from a first BWP configuration to a second BWP configuration based on a trigger indicating that the UE is to transition from a first activity state to a second activity state, the first activity state and the second activity state corresponding to communications with the second cell group. The cell group communication manager 1135 may be configured as or otherwise support a means for communicating with the UE via the second cell of the second cell group according to the second activity state and the second BWP configuration.

In some examples, the configuration manager 1140 may be configured as or otherwise support a means for transmitting, to the UE, a configuration message indicating a set of indices, each index associated with a respective BWP configuration of a set of BWP configurations, where a first index of the set of indices is associated with the first BWP configuration and a second index of the set of indices is associated with the second BWP configuration.

In some examples, the switch component 1130 may be configured as or otherwise support a means for determining an expiration of a timer at the UE, where the trigger indicating that the UE is to transition from the first activity state to the second activity state includes the determined expiration.

In some examples, the control signaling transmission component 1145 may be configured as or otherwise support a means for transmitting, to the UE, control signaling including the trigger indicating that the UE is to transition from the first activity state to the second activity state, where determining that the UE has switched from the first BWP configuration to the second BWP configuration is based on the transmitted control signaling.

In some examples, the transmitted control signaling includes a second trigger that indicates that the UE is to switch from the first BWP configuration to the second BWP configuration.

In some examples, the control signaling transmission component 1145 may be configured as or otherwise support a means for transmitting, to the UE, second control signaling including a second trigger indicating that the UE is to switch from the first BWP configuration to the second BWP configuration, determining that the UE has switched from the first BWP configuration to the second BWP configuration is based on the received second control signaling.

In some examples, the transmitted control signaling is transmitted via a cell of the first cell group.

In some examples, the transmitted control signaling is transmitted in a PDCCH transmission, a MAC-CE, a DCI message, or any combination thereof.

In some examples, a first BWP associated with the first BWP configuration at least partially overlaps with a second BWP associated with the second BWP configuration.

In some examples, the first BWP configuration includes a first uplink BWP, a first downlink BWP, or both. In some examples, the second BWP configuration includes a second uplink BWP, a second downlink BWP, or both.

In some examples, each of the first activity state and the second activity state includes a dormancy state, a deactivated state, or an active state.

In some examples, a mode associated with the dormancy state or the deactivated state includes RRM, RLM, one or more Layer 1 measurements, one or more Layer 1 reports, one or more BFD measurements, one or more sounding procedures, uplink control signaling, downlink control signaling, downlink data signaling, or any combination thereof.

In some examples, the first cell group includes a master cell group and the second cell group includes a secondary cell group.

Figure 12:
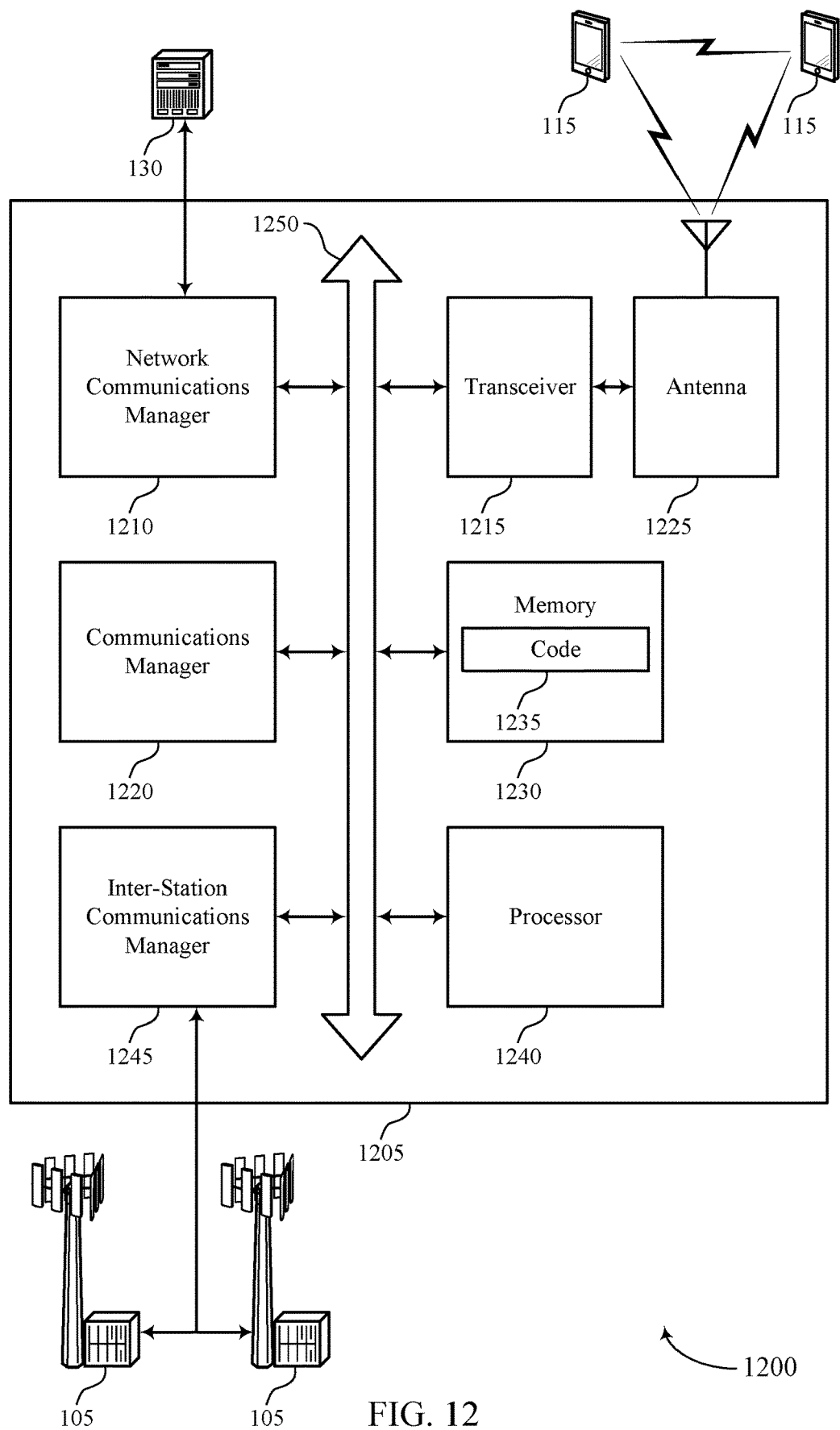
FIG. 12 shows a diagram of a system including a device that supports techniques for switching a BWP configuration in accordance with aspects of the present disclosure.

FIG. 12 shows a diagram of a system 1200 including a device 1205 that supports techniques for switching a BWP configuration in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for switching a BWP configuration). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for establishing a first connection with a UE via at least a first cell of a first cell group. The communications manager 1220 may be configured as or otherwise support a means for establishing a second connection with the UE via at least a second cell of a second cell group. The communications manager 1220 may be configured as or otherwise support a means for determining that the UE has switched from a first BWP configuration to a second BWP configuration based on a trigger indicating that the UE is to transition from a first activity state to a second activity state, the first activity state and the second activity state corresponding to communications with the second cell group. The communications manager 1220 may be configured as or otherwise support a means for communicating with the UE via the second cell of the second cell group according to the second activity state and the second BWP configuration.

By including or configuring the communications manager 1220 in accordance with examples as described herein, the device 1205 may support techniques for improved communication reliability, reduced latency, improved user experience related to reduced processing, reduced power consumption, more efficient utilization of communication resources, improved coordination between devices, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for switching a BWP configuration as described herein, or the processor 1240 and the memory 1230 may be otherwise configured to perform or support such operations.

Figure 13:
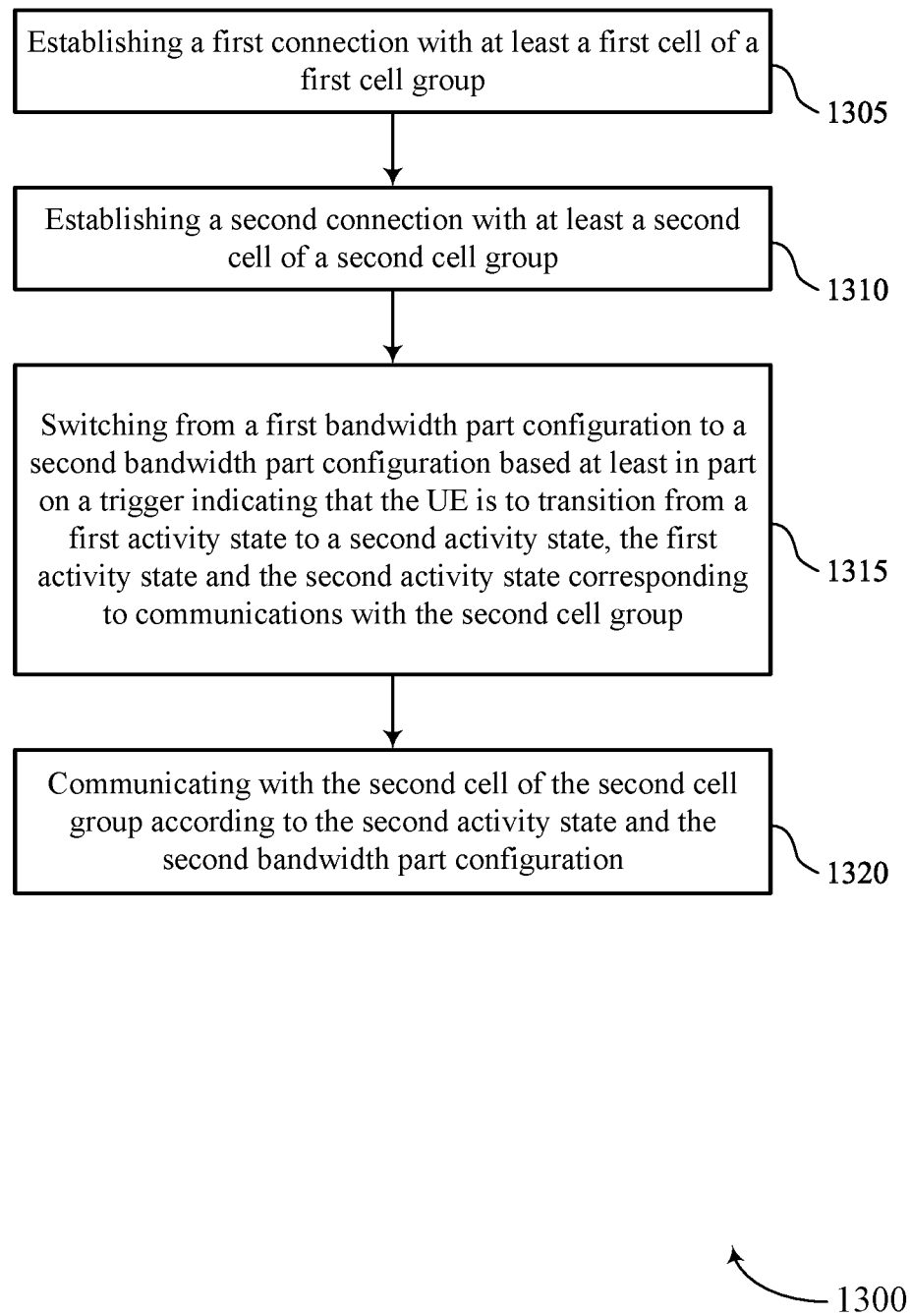
FIGS. 13 through 17 show flowcharts illustrating methods that support techniques for switching a BWP configuration in accordance with aspects of the present disclosure.

FIG. 13 shows a flowchart illustrating a method 1300 that supports techniques for switching a BWP configuration in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include establishing a first connection with at least a first cell of a first cell group. The operations of 1305 may be performed in accordance with examples as disclosed herein. In some examples, aspects of the operations of 1305 may be performed by a cell group connection manager 725 as described with reference to FIG. 7.

At 1310, the method may include establishing a second connection with at least a second cell of a second cell group. The operations of 1310 may be performed in accordance with examples as disclosed herein. In some examples, aspects of the operations of 1310 may be performed by a cell group connection manager 725 as described with reference to FIG. 7.

At 1315, the method may include switching from a first BWP configuration to a second BWP configuration based on a trigger indicating that the UE is to transition from a first activity state to a second activity state, the first activity state and the second activity state corresponding to communications with the second cell group. The operations of 1315 may be performed in accordance with examples as disclosed herein. In some examples, aspects of the operations of 1315 may be performed by a switching manager 730 as described with reference to FIG. 7.

At 1320, the method may include communicating with the second cell of the second cell group according to the second activity state and the second BWP configuration. The operations of 1320 may be performed in accordance with examples as disclosed herein. In some examples, aspects of the operations of 1320 may be performed by a cell group communication component 735 as described with reference to FIG. 7.

Figure 14:
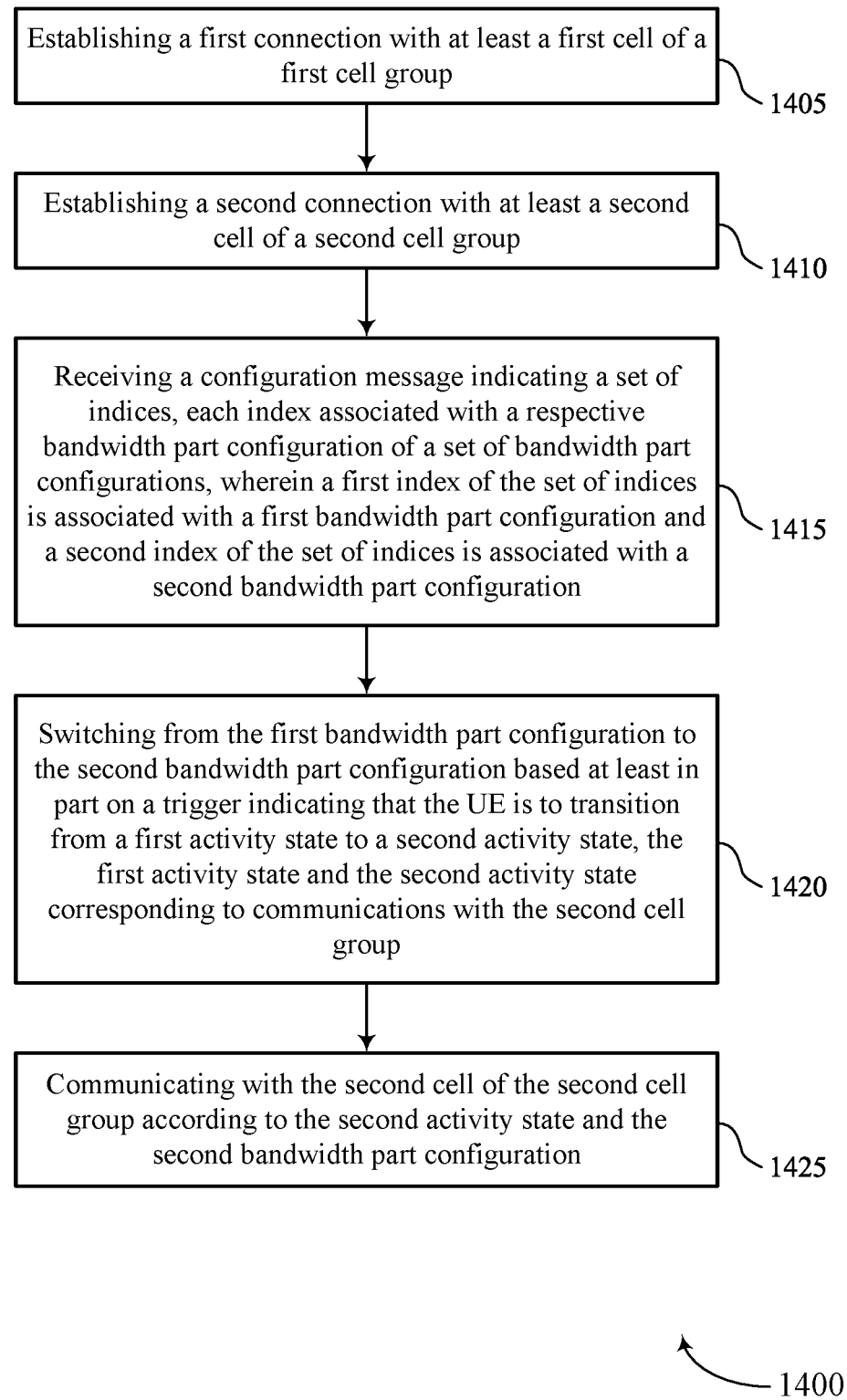

FIG. 14 shows a flowchart illustrating a method 1400 that supports techniques for switching a BWP configuration in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include establishing a first connection with at least a first cell of a first cell group. The operations of 1405 may be performed in accordance with examples as disclosed herein. In some examples, aspects of the operations of 1405 may be performed by a cell group connection manager 725 as described with reference to FIG. 7.

At 1410, the method may include establishing a second connection with at least a second cell of a second cell group. The operations of 1410 may be performed in accordance with examples as disclosed herein. In some examples, aspects of the operations of 1410 may be performed by a cell group connection manager 725 as described with reference to FIG. 7.

At 1415, the method may include receiving a configuration message indicating a set of indices, each index associated with a respective BWP configuration of a set of BWP configurations, wherein a first index of the set of indices is associated with a first BWP configuration and a second index of the set of indices is associated with a second BWP configuration. The operations of 1415 may be performed in accordance with examples as disclosed herein. In some examples, aspects of the operations of 1415 may be performed by a configuration reception component 745 as described with reference to FIG. 7.

At 1420, the method may include switching from the first BWP configuration to the second BWP configuration based at least in part on a trigger indicating that the UE is to transition from a first activity state to a second activity state, the first activity state and the second activity state corresponding to communications with the second cell group. The operations of 1420 may be performed in accordance with examples as disclosed herein. In some examples, aspects of the operations of 1420 may be performed by a switching manager 730 as described with reference to FIG. 7.

At 1425, the method may include communicating with the second cell of the second cell group according to the second activity state and the second BWP configuration. The operations of 1425 may be performed in accordance with examples as disclosed herein. In some examples, aspects of the operations of 1425 may be performed by a cell group communication component 735 as described with reference to FIG. 7.

Figure 15:
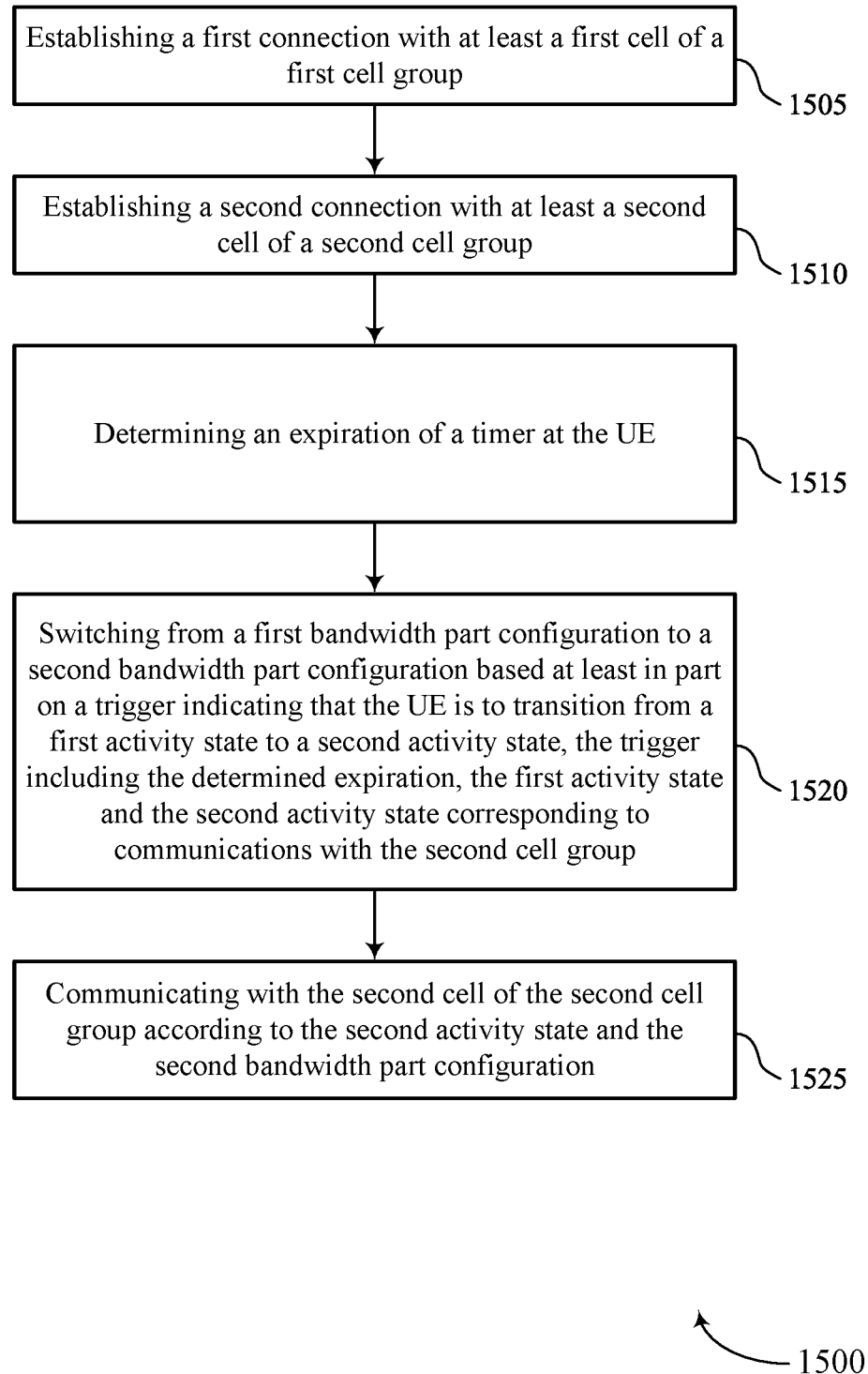

FIG. 15 shows a flowchart illustrating a method 1500 that supports techniques for switching a BWP configuration in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include establishing a first connection with at least a first cell of a first cell group. The operations of 1505 may be performed in accordance with examples as disclosed herein. In some examples, aspects of the operations of 1505 may be performed by a cell group connection manager 725 as described with reference to FIG. 7.

At 1510, the method may include establishing a second connection with at least a second cell of a second cell group. The operations of 1510 may be performed in accordance with examples as disclosed herein. In some examples, aspects of the operations of 1510 may be performed by a cell group connection manager 725 as described with reference to FIG. 7.

At 1515, the method may include determining an expiration of a timer at the UE. The operations of 1515 may be performed in accordance with examples as disclosed herein. In some examples, aspects of the operations of 1515 may be performed by a switching manager 730 as described with reference to FIG. 7.

At 1520, the method may include switching from a first BWP configuration to a second BWP configuration based at least in part on a trigger indicating that the UE is to transition from a first activity state to a second activity state, the trigger including the determined expiration, the first activity state and the second activity state corresponding to communications with the second cell group. The operations of 1520 may be performed in accordance with examples as disclosed herein. In some examples, aspects of the operations of 1520 may be performed by a switching manager 730 as described with reference to FIG. 7.

At 1525, the method may include communicating with the second cell of the second cell group according to the second activity state and the second BWP configuration. The operations of 1525 may be performed in accordance with examples as disclosed herein. In some examples, aspects of the operations of 1525 may be performed by a cell group communication component 735 as described with reference to FIG. 7.

Figure 16:
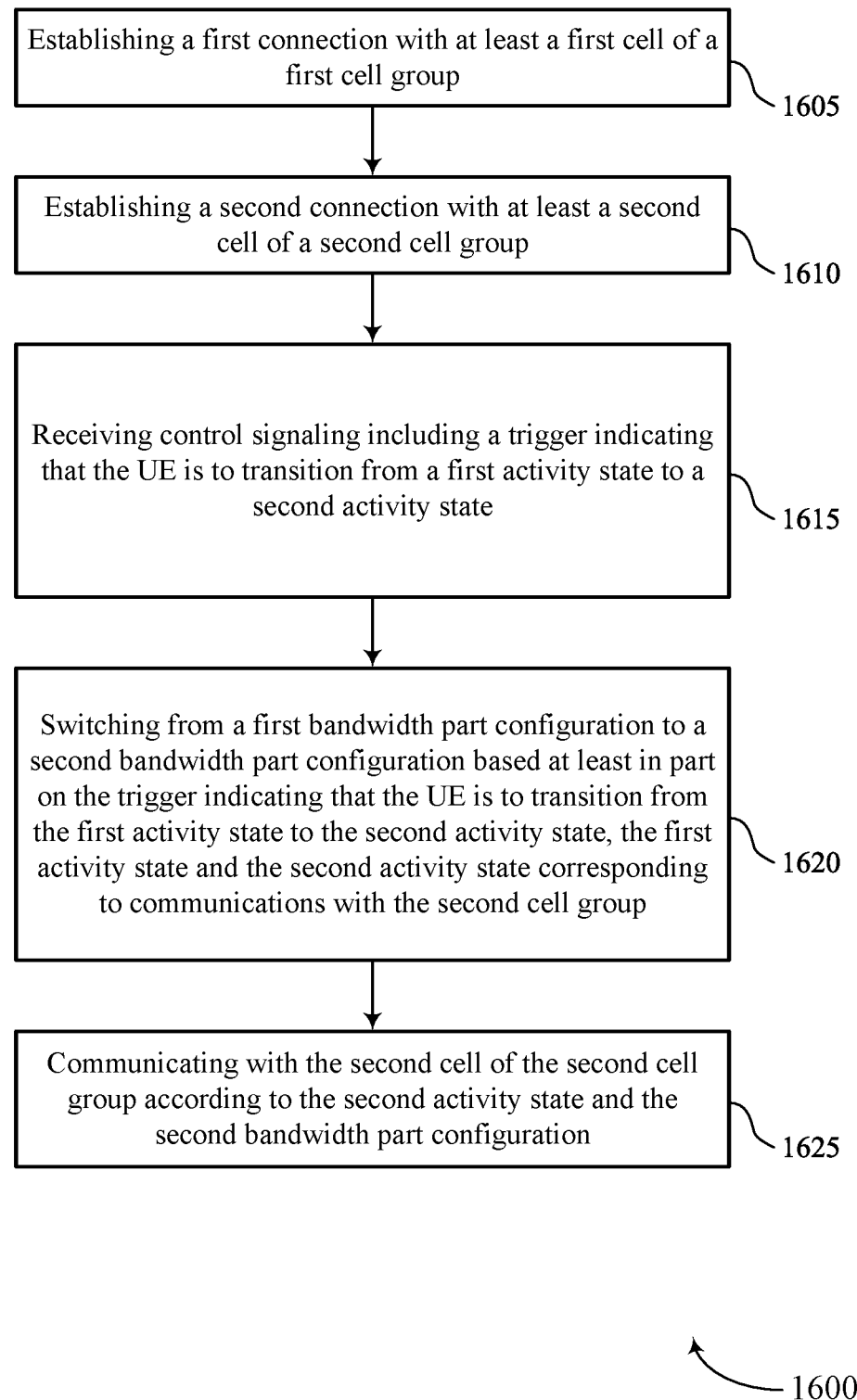

FIG. 16 shows a flowchart illustrating a method 1600 that supports techniques for switching a BWP configuration in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include establishing a first connection with at least a first cell of a first cell group. The operations of 1605 may be performed in accordance with examples as disclosed herein. In some examples, aspects of the operations of 1605 may be performed by a cell group connection manager 725 as described with reference to FIG. 7.

At 1610, the method may include establishing a second connection with at least a second cell of a second cell group. The operations of 1610 may be performed in accordance with examples as disclosed herein. In some examples, aspects of the operations of 1610 may be performed by a cell group connection manager 725 as described with reference to FIG. 7.

At 1615, the method may include receiving control signaling including a trigger indicating that the UE is to transition from a first activity state to a second activity state. The operations of 1615 may be performed in accordance with examples as disclosed herein. In some examples, aspects of the operations of 1615 may be performed by a control signaling reception component 750 as described with reference to FIG. 7.

At 1620, the method may include switching from a first BWP configuration to a second BWP configuration based at least in part on the trigger indicating that the UE is to transition from the first activity state to the second activity state, the first activity state and the second activity state corresponding to communications with the second cell group. The operations of 1620 may be performed in accordance with examples as disclosed herein. In some examples, aspects of the operations of 1620 may be performed by a switching manager 730 as described with reference to FIG. 7.

At 1625, the method may include communicating with the second cell of the second cell group according to the second activity state and the second BWP configuration. The operations of 1625 may be performed in accordance with examples as disclosed herein. In some examples, aspects of the operations of 1625 may be performed by a cell group communication component 735 as described with reference to FIG. 7.

Figure 17:
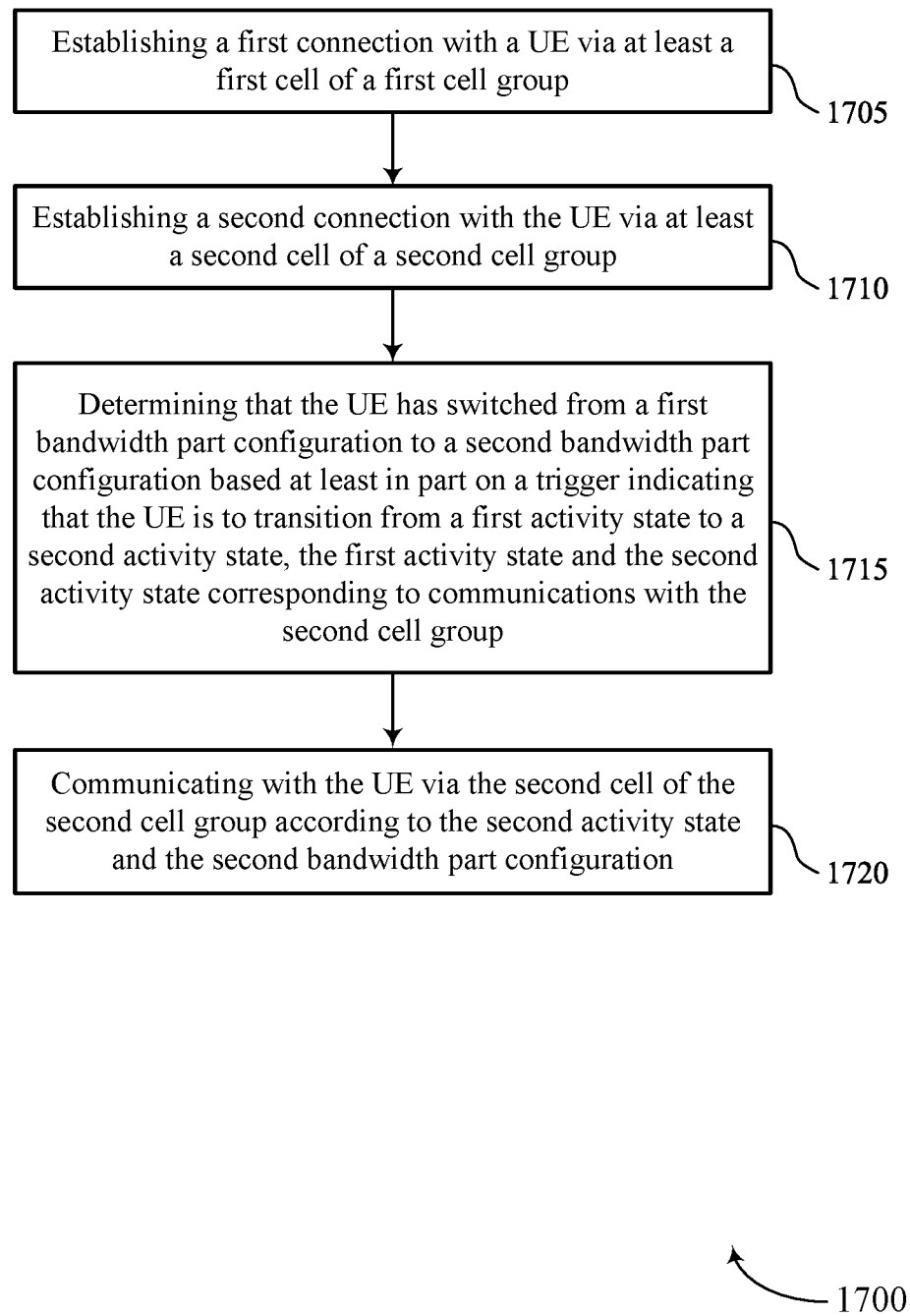

FIG. 17 shows a flowchart illustrating a method 1700 that supports techniques for switching a BWP configuration in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include establishing a first connection with a UE via at least a first cell of a first cell group. The operations of 1705 may be performed in accordance with examples as disclosed herein. In some examples, aspects of the operations of 1705 may be performed by a cell group connection component 1125 as described with reference to FIG. 11.

At 1710, the method may include establishing a second connection with the UE via at least a second cell of a second cell group. The operations of 1710 may be performed in accordance with examples as disclosed herein. In some examples, aspects of the operations of 1710 may be performed by a switch component 1130 as described with reference to FIG. 11.

At 1715, the method may include determining that the UE has switched from a first BWP configuration to a second BWP configuration based on a trigger indicating that the UE is to transition from a first activity state to a second activity state, the first activity state and the second activity state corresponding to communications with the second cell group. The operations of 1715 may be performed in accordance with examples as disclosed herein. In some examples, aspects of the operations of 1715 may be performed by a cell group connection component 1125 as described with reference to FIG. 11.

At 1720, the method may include communicating with the UE via the second cell of the second cell group according to the second activity state and the second BWP configuration. The operations of 1720 may be performed in accordance with examples as disclosed herein. In some examples, aspects of the operations of 1720 may be performed by a cell group communication manager 1135 as described with reference to FIG. 11.

The following provides an overview of aspects of the present disclosure:

Aspect 1: A method for wireless communication at a UE, comprising: establishing a first connection with at least a first cell of a first cell group; establishing a second connection with at least a second cell of a second cell group; switching from a first BWP configuration to a second BWP configuration based at least in part on a trigger indicating that the UE is to transition from a first activity state to a second activity state, the first activity state and the second activity state corresponding to communications with the second cell group; and communicating with the second cell of the second cell group according to the second activity state and the second BWP configuration.

Aspect 2: The method of aspect 1, further comprising: transitioning from the first activity state to the second activity state based at least in part on the trigger indicating that the UE is to transition from the first activity state to the second activity state, wherein communicating with the second cell of the second cell group is based at least in part on transitioning from the first activity state to the second activity state.

Aspect 3: The method of any of aspects 1 through 2, further comprising: receiving a configuration message indicating a set of indices, each index associated with a respective BWP configuration of a set of BWP configurations, wherein a first index of the set of indices is associated with the first BWP configuration and a second index of the set of indices is associated with the second BWP configuration.

Aspect 4: The method of any of aspects 1 through 3, further comprising: determining an expiration of a timer at the UE, wherein the trigger indicating that the UE is to transition from the first activity state to the second activity state includes the determined expiration.

Aspect 5: The method of any of aspects 1 through 4, further comprising: receiving control signaling including the trigger indicating that the UE is to transition from the first activity state to the second activity state, wherein switching from the first BWP configuration to the second BWP configuration is based at least in part on the received control signaling.

Aspect 6: The method of aspect 5, wherein the received control signaling includes a second trigger that indicates that the UE is to switch from the first BWP configuration to the second BWP configuration.

Aspect 7: The method of any of aspects 5 through 6, further comprising: receiving second control signaling including a second trigger indicating that the UE is to switch from the first BWP configuration to the second BWP configuration, wherein switching from the first BWP configuration to the second BWP configuration is based at least in part on the received second control signaling.

Aspect 8: The method of any of aspects 5 through 7, wherein the received control signaling is received via a cell of the first cell group.

Aspect 9: The method of any of aspects 5 through 8, wherein the received control signaling is received in a PDCCH transmission, a MAC-CE, a DCI message, or any combination thereof.

Aspect 10: The method of any of aspects 1 through 9, further comprising: performing one or more network synchronization operations, wherein communicating with the second cell of the second cell group is based at least in part on the performed one or more network synchronization operations.

Aspect 11: The method of any of aspects 1 through 10, wherein a first BWP associated with the first BWP configuration at least partially overlaps with a second BWP associated with the second BWP configuration.

Aspect 12: The method of any of aspects 1 through 11, wherein the first BWP configuration includes a first uplink BWP, a first downlink BWP, or both; and the second BWP configuration includes a second uplink BWP, a second downlink BWP, or both.

Aspect 13: The method of any of aspects 1 through 12, wherein each of the first activity state and the second activity state includes a dormancy state, a deactivated state, or an active state.

Aspect 14: The method of aspect 13, wherein a mode associated with the dormancy state or the deactivated state includes RRM, RLM, one or more Layer 1 measurements, one or more Layer 1 reports, one or more BFD measurements, one or more sounding procedures, uplink control signaling, downlink control signaling, downlink data signaling, or any combination thereof.

Aspect 15: The method of any of aspects 1 through 14, wherein the first cell group includes a master cell group and the second cell group includes a secondary cell group.

Aspect 16: A method for wireless communication at a base station, comprising: establishing a first connection with a UE via at least a first cell of a first cell group; establishing a second connection with the UE via at least a second cell of a second cell group; determining that the UE has switched from a first BWP configuration to a second BWP configuration based at least in part on a trigger indicating that the UE is to transition from a first activity state to a second activity state, the first activity state and the second activity state corresponding to communications with the second cell group; and communicating with the UE via the second cell of the second cell group according to the second activity state and the second BWP configuration.

Aspect 17: The method of aspect 16, further comprising: transmitting, to the UE, a configuration message indicating a set of indices, each index associated with a respective BWP configuration of a set of BWP configurations, wherein a first index of the set of indices is associated with the first BWP configuration and a second index of the set of indices is associated with the second BWP configuration.

Aspect 18: The method of any of aspects 16 through 17, further comprising: determining an expiration of a timer at the UE, wherein the trigger indicating that the UE is to transition from the first activity state to the second activity state includes the determined expiration.

Aspect 19: The method of any of aspects 16 through 18, further comprising: transmitting, to the UE, control signaling including the trigger indicating that the UE is to transition from the first activity state to the second activity state, wherein determining that the UE has switched from the first BWP configuration to the second BWP configuration is based at least in part on the transmitted control signaling.

Aspect 20: The method of aspect 19, wherein the transmitted control signaling includes a second trigger that indicates that the UE is to switch from the first BWP configuration to the second BWP configuration.

Aspect 21: The method of any of aspects 19 through 20, further comprising: transmitting, to the UE, second control signaling including a second trigger indicating that the UE is to switch from the first BWP configuration to the second BWP configuration, determining that the UE has switched from the first BWP configuration to the second BWP configuration is based at least in part on the received second control signaling.

Aspect 22: The method of any of aspects 19 through 21, wherein the transmitted control signaling is transmitted via a cell of the first cell group.

Aspect 23: The method of any of aspects 19 through 22, wherein the transmitted control signaling is transmitted in a PDCCH transmission, a MAC-CE, a DCI message, or any combination thereof.

Aspect 24: The method of any of aspects 19 through 23, wherein a first BWP associated with the first BWP configuration at least partially overlaps with a second BWP associated with the second BWP configuration.

Aspect 25: The method of any of aspects 19 through 24, wherein the first BWP configuration includes a first uplink BWP, a first downlink BWP, or both; and the second BWP configuration includes a second uplink BWP, a second downlink BWP, or both.

Aspect 26: The method of any of aspects 19 through 25, wherein each of the first activity state and the second activity state includes a dormancy state, a deactivated state, or an active state.

Aspect 27: The method of aspect 26, wherein a mode associated with the dormancy state or the deactivated state includes RRM, RLM, one or more Layer 1 measurements, one or more Layer 1 reports, one or more BFD measurements, one or more sounding procedures, uplink control signaling, downlink control signaling, downlink data signaling, or any combination thereof.

Aspect 28: The method of any of aspects 19 through 27, wherein the first cell group includes a master cell group and the second cell group includes a secondary cell group.

Aspect 29: An apparatus for wireless communication at a UE, comprising a processor; memory coupled with the processor; and instructions stored in the memory and executable by the processor to cause the apparatus to perform a method of any of aspects 1 through 15.

Aspect 30: An apparatus for wireless communication at a UE, comprising at least one means for performing a method of any of aspects 1 through 15.

Aspect 31: A non-transitory computer-readable medium storing code for wireless communication at a UE, the code comprising instructions executable by a processor to perform a method of any of aspects 1 through 15.

Aspect 32: An apparatus for wireless communication at a base station, comprising a processor; memory coupled with the processor; and instructions stored in the memory and executable by the processor to cause the apparatus to perform a method of any of aspects 16 through 28.

Aspect 33: An apparatus for wireless communication at a base station, comprising at least one means for performing a method of any of aspects 16 through 28.

Aspect 34: A non-transitory computer-readable medium storing code for wireless communication at a base station, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   establishing a first connection with at least a first cell of a first cell group;
   establishing a second connection with at least a second cell of a second cell group;
   switching from a first bandwidth part configuration to a second bandwidth part configuration based at least in part on a trigger indicating that the UE is to transition from a first activity state to a second activity state, the first activity state and the second activity state corresponding to communications with the second cell group, the second activity state associated with a plurality of modes, each mode of the plurality of modes comprising a respective combination of distinct measurement types to be performed by the UE while in the second activity state, wherein the second bandwidth part configuration is based at least in part on the respective combination of distinct measurement types performed by the UE operating in one or more of the plurality of modes; and
   communicating with the second cell of the second cell group according to the second activity state and the second bandwidth part configuration.

2. The method of claim 1, further comprising:
   transitioning from the first activity state to the second activity state based at least in part on the trigger indicating that the UE is to transition from the first activity state to the second activity state, wherein communicating with the second cell of the second cell group is based at least in part on transitioning from the first activity state to the second activity state.

3. The method of claim 1, further comprising:
   receiving a configuration message indicating a set of indices, each index associated with a respective bandwidth part configuration of a set of bandwidth part configurations, wherein a first index of the set of indices is associated with the first bandwidth part configuration and a second index of the set of indices is associated with the second bandwidth part configuration.

4. The method of claim 1, further comprising:
   determining an expiration of a timer at the UE, wherein the trigger indicating that the UE is to transition from the first activity state to the second activity state includes the determined expiration.

5. The method of claim 1, further comprising:
   receiving control signaling including the trigger indicating that the UE is to transition from the first activity state to the second activity state, wherein switching from the first bandwidth part configuration to the second bandwidth part configuration is based at least in part on the received control signaling.

6. The method of claim 5, wherein the received control signaling includes a second trigger that indicates that the UE is to switch from the first bandwidth part configuration to the second bandwidth part configuration.

7. The method of claim 5, further comprising:
   receiving second control signaling including a second trigger indicating that the UE is to switch from the first bandwidth part configuration to the second bandwidth part configuration, wherein switching from the first bandwidth part configuration to the second bandwidth part configuration is based at least in part on the received second control signaling.

8. The method of claim 5, wherein the received control signaling is received via a cell of the first cell group.

9. The method of claim 5, wherein the received control signaling is received in a physical downlink control channel transmission, a medium access control element, a downlink control information message, or any combination thereof.

10. The method of claim 1, further comprising:
    performing one or more network synchronization operations, wherein communicating with the second cell of the second cell group is based at least in part on the performed one or more network synchronization operations.

11. The method of claim 1, wherein a first bandwidth part associated with the first bandwidth part configuration at least partially overlaps with a second bandwidth part associated with the second bandwidth part configuration.

12. The method of claim 1, wherein:
    the first bandwidth part configuration includes a first uplink bandwidth part, a first downlink bandwidth part, or both; and
    the second bandwidth part configuration includes a second uplink bandwidth part, a second downlink bandwidth part, or both.

13. The method of claim 1, wherein each of the first activity state and the second activity state includes a dormancy state, a deactivated state, or an active state.

14. The method of claim 13, wherein a mode of the plurality of modes associated with the dormancy state or the deactivated state includes radio resource management, radio link monitoring, one or more Layer 1 measurements, one or more Layer 1 reports, one or more beam failure detection measurements, one or more sounding procedures, uplink control signaling, downlink control signaling, downlink data signaling, or any combination thereof.

15. The method of claim 1, wherein the first cell group includes a master cell group and the second cell group includes a secondary cell group.

16. A method for wireless communication at a network entity, comprising:
    establishing a first connection with a user equipment (UE) via at least a first cell of a first cell group;
    establishing a second connection with the UE via at least a second cell of a second cell group;
    determining that the UE has switched from a first bandwidth part configuration to a second bandwidth part configuration based at least in part on a trigger indicating that the UE is to transition from a first activity state to a second activity state, the first activity state and the second activity state corresponding to communications with the second cell group, the second activity state associated with a plurality of modes, each mode of the plurality of modes comprising a respective combination of distinct measurement types to be performed by the UE while in the second activity state, wherein the second bandwidth part configuration is based at least in part on the respective combination of distinct measurement types performed by the UE operating in one or more of the plurality of modes; and communicating with the UE via the second cell of the second cell group according to the second activity state and the second bandwidth part configuration.

17. The method of claim 16, further comprising:

transmitting, to the UE, a configuration message indicating a set of indices, each index associated with a respective bandwidth part configuration of a set of bandwidth part configurations, wherein a first index of the set of indices is associated with the first bandwidth part configuration and a second index of the set of indices is associated with the second bandwidth part configuration.

18. The method of claim 16, further comprising:

determining an expiration of a timer at the UE, wherein the trigger indicating that the UE is to transition from the first activity state to the second activity state includes the determined expiration.

19. The method of claim 16, further comprising:

transmitting, to the UE, control signaling including the trigger indicating that the UE is to transition from the first activity state to the second activity state, wherein determining that the UE has switched from the first bandwidth part configuration to the second bandwidth part configuration is based at least in part on the transmitted control signaling.

20. The method of claim 19, wherein the transmitted control signaling includes a second trigger that indicates that the UE is to switch from the first bandwidth part configuration to the second bandwidth part configuration.

21. The method of claim 19, further comprising:

transmitting, to the UE, second control signaling including a second trigger indicating that the UE is to switch from the first bandwidth part configuration to the second bandwidth part configuration, determining that the UE has switched from the first bandwidth part configuration to the second bandwidth part configuration is based at least in part on the transmitted second control signaling.

22. The method of claim 19, wherein the transmitted control signaling is transmitted via a cell of the first cell group.

23. The method of claim 19, wherein the transmitted control signaling is transmitted in a physical downlink control channel transmission, a medium access control element, a downlink control information message, or any combination thereof.

24. The method of claim 19, wherein a first bandwidth part associated with the first bandwidth part configuration at least partially overlaps with a second bandwidth part associated with the second bandwidth part configuration.

25. The method of claim 19, wherein:

the first bandwidth part configuration includes a first uplink bandwidth part, a first downlink bandwidth part, or both; and the second bandwidth part configuration includes a second uplink bandwidth part, a second downlink bandwidth part, or both.

26. The method of claim 19, wherein each of the first activity state and the second activity state includes a dormancy state, a deactivated state, or an active state.

27. The method of claim 26, wherein a mode of the plurality of modes associated with the dormancy state or the deactivated state includes radio resource management, radio link monitoring, one or more Layer 1 measurements, one or more Layer 1 reports, one or more beam failure detection measurements, one or more sounding procedures, uplink control signaling, downlink control signaling, downlink data signaling, or any combination thereof.

28. The method of claim 19, wherein the first cell group includes a master cell group and the second cell group includes a secondary cell group.

29. An apparatus for wireless communication at a user equipment (UE), comprising:

a processor;

memory coupled with the processor; and instructions stored in the memory and executable by the processor to cause the apparatus to:

establish a first connection with at least a first cell of a first cell group;

establish a second connection with at least a second cell of a second cell group;

switch from a first bandwidth part configuration to a second bandwidth part configuration based at least in part on a trigger indicating that the UE is to transition from a first activity state to a second activity state, the first activity state and the second activity state corresponding to communications with the second cell group, the second activity state associated with a plurality of modes, each mode of the plurality of modes comprising a respective combination of distinct measurement types to be performed by the UE while in the second activity state, wherein the second bandwidth part configuration is based at least in part on the respective combination of distinct measurement types performed by the UE operating in one or more of the plurality of modes; and communicate with the second cell of the second cell group according to the second activity state and the second bandwidth part configuration.

30. An apparatus for wireless communication at a network entity, comprising:

a processor;

memory coupled with the processor; and instructions stored in the memory and executable by the processor to cause the apparatus to:

establish a first connection with a user equipment (UE) via at least a first cell of a first cell group;

establish a second connection with the UE via at least a second cell of a second cell group;

determine that the UE has switched from a first bandwidth part configuration to a second bandwidth part configuration based at least in part on a trigger indicating that the UE is to transition from a first activity state to a second activity state, the first activity state and the second activity state corresponding to communications with the second cell group, the second activity state associated with a plurality of modes, each mode of the plurality of modes comprising a respective combination of distinct measurement types to be performed by the UE while in the second activity state, wherein the second bandwidth part configuration is based at least in part on the respective combination of distinct measurement types performed by the UE operating in one or more of the plurality of modes; and communicate with the UE via the second cell of the second cell group according to the second activity state and the second bandwidth part configuration.

* * * * *